United States Patent
Lee et al.

(10) Patent No.: US 12,328,137 B2
(45) Date of Patent: Jun. 10, 2025

(54) ACCESSORY AND ELECTRONIC DEVICE COMPRISING THE SAME

(71) Applicant: Samsung Electronics Co., Ltd., Gyeonggi-do (KR)

(72) Inventors: Jinyong Lee, Gyeonggi-do (KR); Chulin Cho, Gyeonggi-do (KR); Jinhyeok Heo, Gyeonggi-do (KR); Yeongsu Choi, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 351 days.

(21) Appl. No.: 17/880,781

(22) Filed: Aug. 4, 2022

(65) Prior Publication Data

US 2022/0416832 A1 Dec. 29, 2022

Related U.S. Application Data

(63) Continuation of application No. PCT/KR2022/008273, filed on Jun. 13, 2022.

(30) Foreign Application Priority Data

Jun. 24, 2021 (KR) .......................... 10-2021-0082468
Aug. 5, 2021 (KR) .......................... 10-2021-0103225

(51) Int. Cl.
*H04B 1/3888* (2015.01)
*H04M 1/02* (2006.01)

(52) U.S. Cl.
CPC ........ *H04B 1/3888* (2013.01); *H04M 1/0216* (2013.01)

(58) Field of Classification Search
CPC .......................... H04B 1/3888; H04M 1/0216
(Continued)

(56) References Cited

U.S. PATENT DOCUMENTS 7,912,522 B2 * 3/2011 Pierson ............... H04B 1/3833
455/575.3
9,705,552 B1 7/2017 Tall
(Continued)

FOREIGN PATENT DOCUMENTS

CN 202233553 U 5/2012
CN 211791660 U 10/2020
(Continued)

OTHER PUBLICATIONS

Extended European Search Report dated Jun. 3, 2024.
International Search Report Dated Sep. 27, 2022.

*Primary Examiner* — Nghi H Ly
(74) *Attorney, Agent, or Firm* — Cha & Reiter, LLC

(57) ABSTRACT

An accessory according to an example embodiment may be for an electronic device including a first housing, a second housing, and a hinge cover connecting the first housing to the second housing, and may include a first cover to cover the first housing, a second cover to cover the second housing, a holder configured to receive a body part of a user to hold the electronic device, and a connector to connect the holder to the first cover and the second cover. The connector may be configured have a first shape in an unfolded state of the electronic device, and have a second shape different from the first shape in a folded state of the electronic device. At least a portion of the connector may be deformed in the second shape. Other embodiments are also possible.

23 Claims, 28 Drawing Sheets

(58) Field of Classification Search
USPC .......... 455/575.3, 575.1, 575.5, 575.8, 550.1
See application file for complete search history.

(56) References Cited

U.S. PATENT DOCUMENTS

| | | | |
|---|---|---|---|
| 10,314,185 | B2 | 6/2019 | Cavenagh et al. |
| D894,167 | S | 8/2020 | Feller |
| 2019/0166703 | A1* | 5/2019 | Kim .................... H04M 1/022 |
| 2020/0297103 | A1 | 9/2020 | Jang |

FOREIGN PATENT DOCUMENTS

| | | |
|---|---|---|
| CN | 212696050 U | 3/2021 |
| JP | 2021-40224 A | 3/2021 |
| KR | 20-0340068 Y1 | 1/2004 |
| KR | 10-1866881 B1 | 6/2018 |
| KR | 10-1956481 B1 | 3/2019 |
| KR | 10-2161481 B1 | 10/2020 |

* cited by examiner

ACCESSORY AND ELECTRONIC DEVICE COMPRISING THE SAME

CROSS-REFERENCE TO RELATED APPLICATIONS

This application is a continuation of International Application No. PCT/KR2022/008273 designating the United States, filed on Jun. 13, 2022, filed in the Korean Intellectual Property Receiving Office and claiming priority to Korean Patent Application No. 10-2021-0082468, filed on Jun. 24, 2021 and Korean Patent Application No. 10-2021-0103225, filed on Aug. 5, 2021 in the Korean Intellectual Property Office, the disclosures of which are incorporated by reference herein in their entireties.

BACKGROUND

1. Field

One or more embodiments of the instant disclosure generally relate to an accessory and an electronic device including the same.

2. Description of Related Art

To facilitate the operations of capturing and displaying photographs or videos by an electronic device, an accessory supporting easy grip or stable pedestal for the electronic device has been developed.

SUMMARY

Example embodiments of the disclosure may be an accessory that provides easy grip or stable pedestal for an electronic device and the electronic device including the same.

According to an example embodiment, an accessory may be for an electronic device including a first housing, a second housing, and a hinge cover connecting the first housing to the second housing, and the accessory may include a first cover configured to cover the first housing, a second cover configured to cover the second housing, a holder configured to receive a body part of a user, and a connector configured to connect the holder to the first cover and the second cover, wherein the connector is configured to have a first shape in an unfolded state of the electronic device, and have a second shape different from the first shape in a folded state of the electronic device, and wherein at least a portion of the connector is deformed in the second shape.

According to an example embodiment, an accessory may be for an electronic device including a first housing and a second housing, the accessory may include a first cover configured to cover the first housing, a second cover configured to cover the second housing, a holder configured to receive a body part of a user, and a connector configured to connect the holder to the first cover and the second cover, wherein the first housing and the second housing are configured to slide between a first position in which the first housing and the second housing are spaced apart by a first distance and a second position in which the first housing and the second housing are spaced apart by a second distance greater than the first distance, wherein the connector is configured to have a first shape at the first position and have a second shape different from the first shape at the second position, and wherein at least a portion of the connector is deformed in the second shape.

The effects of the accessory and the electronic device including the same according to certain example embodiments are not limited to the above descriptions, and other unmentioned effects can be clearly understood from the following description by one of ordinary skill in the art.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

According to certain example embodiments, an accessory, which is easily attached to and detached from an electronic device, may be provided.

According to certain example embodiments, an accessory allowing the user to easily hold (e.g., grip) an electronic device may be provided.

According to certain example embodiments, an accessory providing a stable pedestal for an electronic device may be provided.

Figure 1:
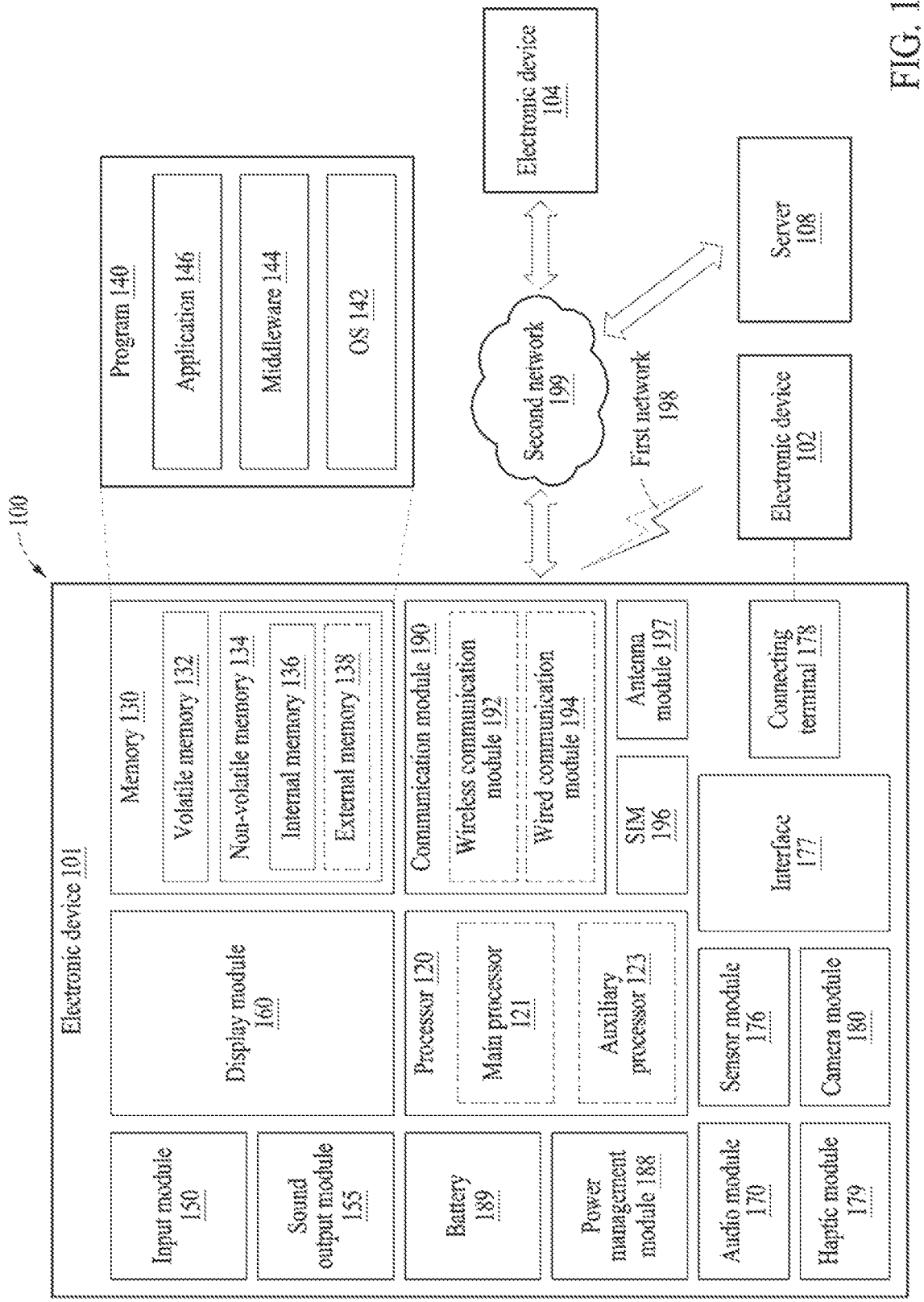
FIG. 1 is a block diagram of an electronic device in a network environment according to an example embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to certain example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that certain example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to certain example embodiments, each component (e.g., a module or a program) of the above-described components may include a single entity or multiple entities, and some of the multiple entities may be separately disposed in different components. According to certain example embodiments, one or more of the above-described components may be omitted, or one or more other components may be added. Alternatively or additionally, a plurality of components (e.g., modules or programs) may be integrated into a single component. In such a case, according to certain example embodiments, the integrated component may still perform one or more functions of each of the plurality of components in the same or similar manner as they are performed by a corresponding one of the plurality of components before the integration.

Figure 2A:
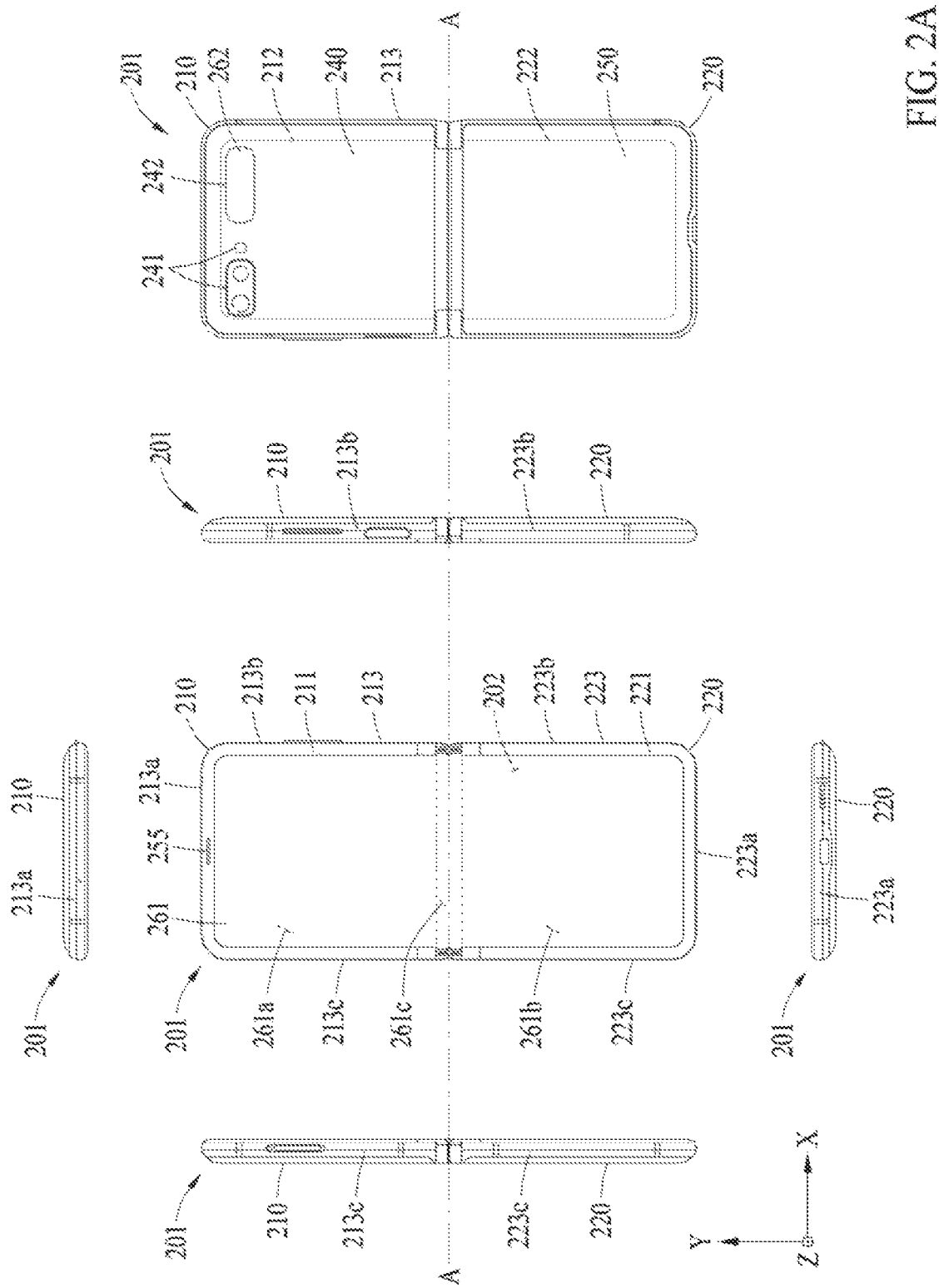
FIG. 2A is views of an electronic device in an unfolded state according to an example embodiment.
Figure 2B:
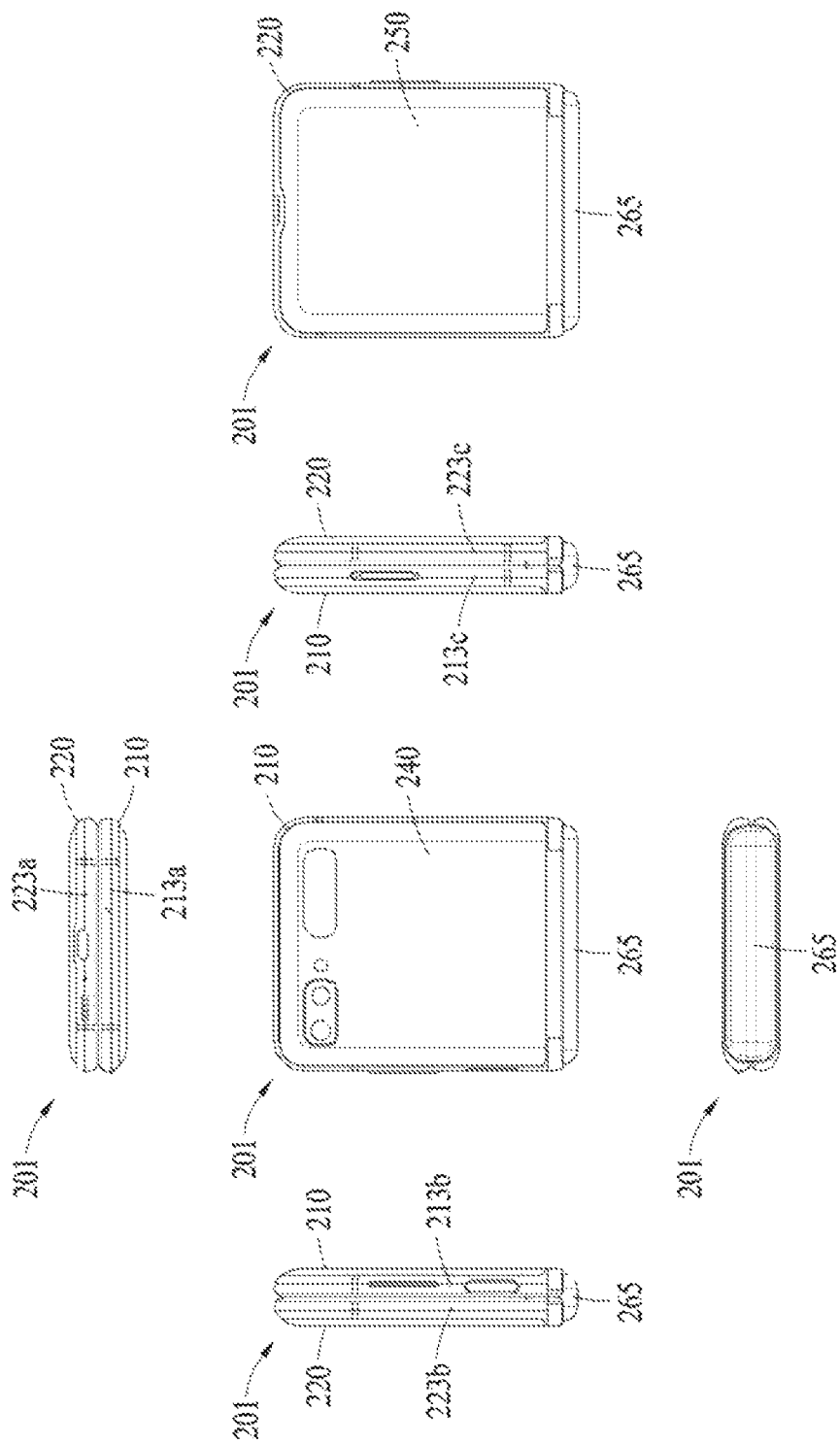
FIG. 2B is views of an electronic device in a folded state according to an example embodiment.

Referring to FIGS. 2A and 2B, a foldable electronic device 201 may include a pair of housings 210 and 220 rotatably coupled to each other through a hinge structure to be folded with respect to each other, a hinge cover 265 for covering foldable portions of the pair of housings 210 and 220, and a display 261 (e.g., flexible display or foldable display) disposed in a space formed by the pair of housings 210 and 220. In the present disclosure, the surface on which the display 261 is disposed may be referred to as the front surface of the foldable electronic device 201, and the surface opposite to the front surface may be referred to as the rear surface of the foldable electronic device 201. In addition, the surface surrounding the space between the front surface and the rear surface may be referred to as the side surface of the foldable electronic device 201.

In one example embodiment, the pair of housings 210 and 220 may include a first housing 210, a second housing 220, a first rear cover 240, and a second rear cover 250. The pair of housings 210 and 220 of the electronic device 201 are not limited to the shapes or the combination and/or coupling of components shown in FIGS. 2A and 2B, and may be implemented in other shapes or by another combination and/or coupling of components.

In an example embodiment, the first housing 210 and the second housing 220 may be disposed on both sides (e.g., the upper portion and the lower portion) with respect to a folding axis A, and may be disposed substantially symmetrically with respect to the folding axis A. In an example embodiment, the angle or distance between the first housing 210 and the second housing 220 may vary depending on whether the electronic device 201 is in an unfolded state, a folded state, or an intermediate state.

In an example embodiment, the first housing 210 may be connected to a hinge structure in the unfolded state of the electronic device 201. The first housing 210 may include a first surface 211 for implementing the front surface of the electronic device 201, a second surface 212 facing a direction opposite to the first surface 211, and a first side portion 213 enclosing at least a portion of the space between the first surface 211 and the second surface 212. The first side member 213 may include a first side surface 213a disposed substantially in parallel with the folding axis A, a second side surface 213b extending in a direction substantially perpendicular to the folding axis A from one end of the first side surface 213a, and a third side surface 213c extending in a direction substantially perpendicular to the folding axis A from another end of the first side surface 213a to be substantially parallel to the second side surface 213b. The second housing 220 may be connected to the hinge structure in the unfolded state of the electronic device 201. The second housing 220 may include a third surface 221 for implementing the front surface of the electronic device 201, a fourth surface 222 facing a direction opposite to the third surface 221, and a second side portion 223 enclosing at least a portion of the space between the third surface 221 and the fourth surface 222. The second side member 223 may include a fourth side surface 223a disposed substantially in parallel with the folding axis A, a fifth side surface 223b extending in a direction substantially perpendicular to the folding axis A from one end of the fourth side surface 223a, and a sixth side surface 223c extending in a direction substantially perpendicular to the folding axis A from another end of the fourth side surface 223a to be substantially parallel to the fifth side surface 223b. The first surface 211 and the third surface 221 may face each other when the electronic device 201 is in the folded state.

In an example embodiment, the electronic device 201 may include a recessed accommodating portion 202 for accommodating the display 261 when the first housing 210 and the second housing 220 are structurally coupled to each other. The accommodating portion 202 may have substantially the same size as the display 261.

In an example embodiment, various portions of the first housing 210 and the second housing 220 may be made of metal or non-metal. The materials may have a predetermined magnitude of rigidity appropriate to support the display 261.

In an example embodiment, the electronic device 201 may include a sound output module 255 (e.g., the sound output module 155 of FIG. 1) disposed through at least a partial area of the first surface 211.

In an example embodiment, the first rear cover 240 may be disposed on the second surface 212 of the first housing 210, and may have a substantially rectangular periphery (e.g. having a rectangular shape with rounded corners). At least a portion of the periphery of the first rear cover 240 may be surrounded by the first housing 210. The second rear cover 250 may be disposed on the fourth surface 222 of the second housing 220, and may have a substantially rectangular periphery. At least a portion of the periphery of the second rear cover 250 may be surrounded by the second housing 220.

In an example embodiment, the first rear cover 240 and the second rear cover 250 may have substantially symmetrical shapes with respect to the folding axis A. In another example embodiment, the first rear cover 240 and the second rear cover 250 may have different shapes. In still another example embodiment, the first housing 210 and the first rear cover 240 may be integrated together as a single component, and the second housing 220 and the second rear cover 250 may be integrated together.

In an example embodiment, the first housing 210, the second housing 220, the first rear cover 240, and the second rear cover 250 may provide a space in which various components (e.g., a PCB, the antenna module 197 of FIG. 1, the sensor module 176 of FIG. 1, or the battery 189 of FIG. 1) of the electronic device 201 may be disposed when the first housing 210, the second housing 220, the first rear cover 240, and the second rear cover 250 are coupled to one another. In an example embodiment, at least one component may be visually exposed on the rear surface of the electronic device 201. For example, at least one component may be visually exposed through a first rear area 241 of the first rear cover 240. Here, the component may include a proximity sensor, a rear camera module, and/or a flash. In an example embodiment, at least a portion of a sub-display 262 may be visually exposed through a second rear area 242 of the first rear cover 240.

In an example embodiment, the display 261 may be disposed in the accommodating portion 202 formed by the pair of housings 210 and 220. For example, the display 261 may be arranged to occupy substantially most of the front surface of the electronic device 201. The front surface of the electronic device 201 may include an area in which the display 261 is disposed, and a partial area (e.g., periphery area) of the first housing 210 and a partial area (e.g., periphery area) of the second housing 220, which are adjacent to the display 261. The rear surface of the electronic device 201 may include the first rear cover 240, a partial area (e.g., periphery area) of the first housing 210 adjacent to the first rear cover 240, the second rear cover 250, and a partial area (e.g., periphery area) of the second housing 220 adjacent to the second rear cover 250. In an example embodiment, the display 261 may be a display in which at least one area is deformable into a planar surface or a curved surface. In an example embodiment, the display 261 may include a folding area 261c, a first area 261a on a first side (e.g., the upper side) of the folding area 261c, and a second area 261b on a second side (e.g., the lower side) of the folding area 261c. For example, the first area 261a may be disposed in the first surface 211 of the first housing 210, and the second area 261b may be disposed in the third surface 221 of the second housing 220. However, the area division of the display 261 shown in FIG. 2A is merely an example, and the display 261 may be divided into a plurality of areas depending on the structure or functions of the display 261. For example, as shown in FIG. 2A, the display 261 may be divided into areas based on the folding axis A or the folding area 261c extending in parallel to the x-axis. But alternatively, the display 261 may be divided into areas based on another folding area (e.g., folding area extending in parallel to a y-axis) or another folding axis (e.g., folding axis parallel to the y-axis). The area division of the display 261 is based on the structures of housings 210 and 220 and the hinge structure, and the display 261 may display substantially one screen without interruption. In an example embodiment, the first area 261a and the second area 261b may have substantially symmetrical shapes with respect to the folding area 261c.

In an example embodiment, the hinge cover 265 may be disposed between the first housing 210 and the second housing 220 and configured to cover the hinge structure. The hinge cover 265 may be hidden by at least a portion of the first housing 210 and the second housing 220 or be exposed to the outside of the device depending on the operating state of the electronic device 201. For example, when the electronic device 201 is in the unfolded state as shown in FIG. 2A, the hinge cover 265 may be hidden by the first housing 210 and the second housing 220 and not be exposed, and when the electronic device 201 is in the folded state as shown in FIG. 2B, the hinge cover 265 may be exposed and be visible from the outside of the device between the first housing 210 and the second housing 220. Meanwhile, when the electronic device 201 is in an intermediate state in which the first housing 210 and the second housing 220 form an angle between 0 and 180 degrees, at least a portion of the hinge cover 265 may be exposed between the first housing 210 and the second housing 220. In this case, the exposed area of the hinge cover 265 may be smaller than the exposed area of the hinge cover 265 when the electronic device 201 is in the folded state. In an example embodiment, the hinge cover 265 may have curved surfaces.

When the electronic device 201 is in the unfolded state (e.g., the state of the electronic device 201 of FIG. 2A), the first housing 210 and the second housing 220 may form a first angle (e.g., about 180 degrees) with each other, and the first area 261a and the second area 261b of the display 261 may be oriented to be in substantially the same direction. The folded area 261c of the display 261 may be on substantially the same plane as the first area 261a and the second area 261b. In another example embodiment, when the electronic device 201 is in the unfolded state, the first housing 210 may be rotated to be at a second angle (e.g., about 360 degrees) relative to the second housing 220, such that the second surface 212 and the fourth surface 222 may face each other (this may be referred to as the first housing 210 and the second housing 220 being reversely folded). Meanwhile, when the electronic device 201 is in the folded state (e.g., the state of the electronic device 201 of FIG. 2B), the first housing 210 and the second housing 220 may face each other. The first housing 210 and the second housing 220 may form an angle of about 0 degrees to about 10 degrees, and the first area 261a and the second area 261b of the display 261 may face each other. At least a portion of the folding area 261c of the display 261 may be deformed into a curved surface. Meanwhile, when the electronic device 201 is in the intermediate state, the first housing 210 and the second housing 220 may form a predetermined angle between each other. The angle (e.g., third angle at about 90 degrees) formed by the first area 261a and the second area 261b of the display 261 may be greater than that when the electronic device 201 is in the folded state and less than that when the electronic device 201 is in the unfolded state. At least a portion of the folding area 261c of the display 261 may be deformed into a curved surface. In this case, the curvature of the curved surface of the folding area 261c may be smaller than that when the electronic device 201 is in the folded state.

Certain example embodiments of the electronic device described herein are not limited to the form factor of the electronic device 201 described with reference to FIGS. 2A and 2B, and may also apply to electronic devices with other form factors.

Referring to FIGS. 3A to 3J, an accessory 370 for an electronic device 301 (e.g., the electronic device 201) may be easily attached to the electronic device 301, easily held by a user, and may have a structure that can be easily decorated by the user without risking substantial damage on the electronic device 301 and/or the accessory 370.

The accessory 370 may include a first cover 371 to cover a first housing 310 (e.g., the first housing 210) and a second cover 372 to cover a second housing 320 (e.g., the second housing 220). The first cover 371 may include a first base surface 371a, which is placed on a surface (e.g., the second surface 212 or the rear surface) of the first housing 310, and a plurality of first side surfaces 371b respectively connected to at least some edges of the edges of the first base surface 371a and respectively placed on a plurality of first side portions 313 of the first housing 310 to enclose at least a portion of the first housing 310 with the first base surface 371a. The second cover 372 may include a second base surface 372a, which is placed on a surface (e.g., the fourth surface 222 or the rear surface) of the second housing 320, and a plurality of second side surfaces 372b respectively connected to at least some edges of the edges of the second base surface 372a and respectively placed on a plurality of second side portions 323 of the second housing 320 to enclose a portion of the second housing 320 with the second base surface 372a. When the electronic device 301 is in the unfolded state (e.g., FIG. 3C), the normal direction of the first base surface 371a and the normal direction of the second base surface 372a may substantially form a first angle (e.g., approximately 0 degrees). When the electronic device 301 is in the folded state (e.g., FIG. 3D), the normal direction of the first base surface 371a and the normal direction of the second base surface 372a may substantially form a second angle (e.g., approximately 180 degrees).

In an example embodiment, the first cover 371 and the second cover 372 may be spaced apart from each other to form a gap G. When the electronic device 301 is in the unfolded state (e.g., FIG. 3D), a portion of a hinge cover 365 (e.g., the hinge cover 265) may be exposed through between the first cover 371 and the second cover 372, but the gap G may be small enough in the unfolded state that the hinge cover 365 may not be substantially exposed. However, when the electronic device 301 is in the folded state (e.g., FIG. 3D), most of the hinge cover 365 may be exposed through the gap G between the first cover 371 and the second cover 372.

In an example embodiment, the first cover 371 may include a sub-display 362 (e.g. the sub-display 262), a sensor module 377 (e.g., the sensor module 176), and/or a first slot 371c that exposes a camera module 380 (e.g., the camera module 180). The first slot 371c may extend along at least a portion of the plurality of first side surfaces 371b of the first cover 371.

In an example embodiment, the first cover 371 may include a second slot 371d that exposes an input module 350 (e.g., the input module 150). The second slot 371d may be formed on a portion of at least one of the plurality of first side surfaces 371b.

In an example embodiment, the first cover 371 may include a protruding portion 371e enclosing another input module (e.g., button). When force by the user is applied to the protruding portion 371e, the force may be delivered to the input module enclosed by the protruding portion 371e. The protruding portion 371e may be formed on a portion of at least one of the first side surfaces 371b adjacent to the second slot 371d.

In an example embodiment, the second cover 372 may include a first notch 372c that expose a connecting terminal 378 (e.g., the connecting terminal 178). The first notch 372c may be formed on at least one of the second side surfaces 372b. In an example embodiment, the second cover 372 may include a second notch 372d formed on another one of the second side surfaces 372b.

On the other hand, the second slot 371d that exposes the input module 350 and the first notch 372c that exposes the connecting terminal 378 and/or the protruding portion 371e enclosing another input module (e.g., button) are not limited to the illustrated examples, and the shape, the form, and/or the position of the slot and/or the notch may vary based on various configurations of the electronic device 301, in particular the configurations of the input module 350, the other input module (e.g., the button), the connecting terminal 378, and other input and connecting components.

In an example embodiment, the second cover 372 may extend along an edge 3721 of the second base surface 372a on which the second side surface 372b is not formed, and may include a pair of second coupling ribs 3722 and 3723 spaced apart from each other based on a second gap G2 and respectively placed on the second base surface 372a and between a pair of the second side surfaces 372b that are facing each other. The pair of second coupling ribs 3722 and 3723 may be configured to couple (e.g., interference fit) to the second housing 320. Although not shown herein, the first cover 371 may extend along an edge 3711 of the first base surface 371a on which the first side surface 371b is not formed, and may similarly include a pair of first coupling ribs spaced apart from each other based on a third gap and respectively placed between the first base surface 371a and a pair of the first side surfaces 371b that are facing each other. The pair of first coupling ribs may be configured to couple (e.g., interference fit) to the first housing 310.

In an example embodiment, the first cover 371 may include a first recess 3714 formed on at least a portion of the first base surface 371a. In an example embodiment, the first recess 3714 and the first slot 371c may together form the first base surface 371a. In an example embodiment, the first cover 371 may include a first lid 3716 configured to cover the first recess 3714. For example, the first recess 3714 may be formed on at least a portion of a surface of the first lid 3716. As another example, the first recess 3714 may be formed on at least a portion of a surface of the first cover 371 facing toward the first housing 310. In an example embodiment, the second cover 372 may include a second recess 3724 formed on at least a portion of the second base surface 372a. In an example embodiment, the second cover 372 may include at least one support rib 3725 placed in the second recess 3724 and extending along the second side surface 372b. In an example embodiment, the second cover 372 may include a second lid 3726 configured to cover the second recess 3724. For example, the second recess 3724 may be formed on at least a portion of a surface of the second lid 3726. As another example, the second recess 3724 may be formed on at least a portion of a surface of the second cover 372 facing toward the second housing 320.

In an example embodiment, at least a portion of the first cover 371 and at least a portion of the second cover 372 may be made of a substantially transparent material, however, the example is not limited thereto. In another example embodiment, at least a portion of the first cover 371 and at least a portion of the second cover 372 may be made of a substantially opaque material.

The accessory 370 may include a holder 373 for the user to hold the electronic device 301. The holder 373 may have a shape to which a finger of the user may be inserted. In an example embodiment, the user may insert a finger into the holder 373 when the electronic device 301 is in the unfolded state (e.g., FIG. 3), and may grip or handle the holder 373, when the electronic device 301 is in the folded state (e.g., FIG. 3D). In an example embodiment, the holder 373 may include a linear portion 373a and a curved portion 373b connected to the linear portion 373a to form a closed loop (e.g., ring) with the linear portion 373a. In an example embodiment, the holder 373 may include a coupling portion 373c connected to the linear portion 373a. In an example embodiment, the linear portion 373a, the curved portion 373b, and the coupling portion 373c may be seamlessly and integrally formed. In an example embodiment, the holder 373 may include at least one (e.g., two) coupler 373d for coupling the coupling portion 373c. For example, the coupler 373d may be a rivet.

The accessory 370 may include a connector 374 configured to connect the holder 373 to the first cover 371 and the second cover 372. The connector 374 may include a first connector 375 and a second connector 376. In an example embodiment, the connector 374 may be referred to as a connecting part or a sheet part. For example, the first connector 375 may be described as a first connecting part or a first sheet part, and the second connector 376 may be described as a second connecting part and a second sheet part.

In an example embodiment, the first connector 375 may include a first coupling portion 375a coupling to the first cover 371, a first deformable portion 375b, which is placed between the first cover 371 and the holder 373 and may be deformed based on the folded state and the unfolded state of the electronic device 301. The first connector 375 may further include a first neck 375c connecting the first coupling portion 375a to the first deformable portion 375b. The second connector 376 may include a second coupling portion 376a coupling to the second cover 372, a second deformable portion 376b, which is placed between the second cover 372 and the holder 373 and may be deformed based on the folded state and the unfolded state of the electronic device 301. The second connector 376 may further include a second neck 376c connecting the second coupling portion 376a to the second deformable portion 376b.

In another example embodiment, the first connector 375 and the second connector 376 may include a plurality of deformable portions respectively. In another example embodiment, one of the first connector 375 and the second connector 376 may include a deformable portion and the other one may not include the deformable portion. In another example embodiment, a single deformable portion may be formed between the first connector 375 and the second connector 376.

In an example embodiment, the first coupling portion 375a may be coupled to the first cover 371 by being accommodated in the first recess 3714 and being covered by the first lid 3716. The second coupling portion 376a may be coupled to the second cover 372 by being accommodated in the second recess 3724 and being covered by the second lid 3726. In an example embodiment, the first lid 3716 may be removed from the first cover 371 and the first coupling portion 375a may be detached from the first recess 3714.

The second lid 3726 may be removed from the second cover 372 and the second coupling portion 376a may be detached from the second recess 3724. In an example embodiment, the second coupling portion 376a may be supported by the at least one support rib 3725. In an example embodiment, the first coupling portion 375a and the second coupling portion 376a may be implemented as sheets. The structure described above may allow the user to exchange different first lids 3716 and/or second lids 3726 having different designs, thereby allowing the user to decorate the device without damaging on the accessory 370.

In another example embodiment, the first coupling portion 375a and the second coupling portion 376a may be integrated with the first cover 371 and the second cover 372, respectively. For example, the first coupling portion 375a and the first cover 371, and the second coupling portion 376a and the second cover 372 may be integrated together, respectively, by insertion, double injection, and another suitable method.

In an example embodiment, when the electronic device 301 is in the unfolded state (e.g., FIG. 3G), the first deformable portion 375b and the second deformable portion 376b may be substantially face each other. In an example embodiment, when the electronic device 301 is in the unfolded state (e.g., FIG. 3G), the first deformable portion 375b and the second deformable portion 376b may be substantially parallel with each other.

In an example embodiment, when the electronic device 301 is in the folded state (e.g., FIG. 3H), the first deformable portion 375b and the second deformable portion 376b may be in a shape curved outwardly while enclosing at least a portion of the hinge cover 365. In an example embodiment, as the electronic device 301 is the folded (e.g., from FIG. 3G to FIG. 3H), the first deformable portion 375b and the second deformable portion 376b may expand in a radial direction from the hinge cover 365. In an example embodiment, when the electronic device 301 is in the folded state (e.g., FIG. 3H), the first connector 375 and the second connector 376 may be configured to enclose at least a portion of the hinge cover 365.

Figure 3A:
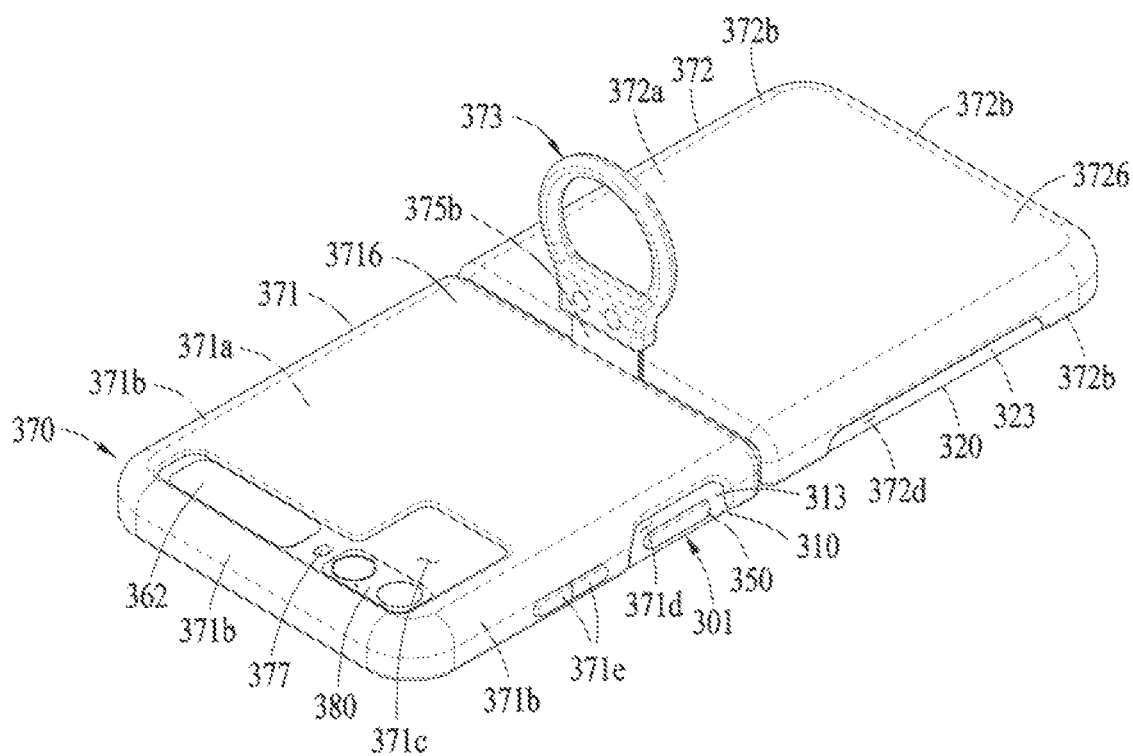
FIG. 3A is a perspective view of an electronic device in an unfolded state including an accessory according to an example embodiment.
Figure 3B:
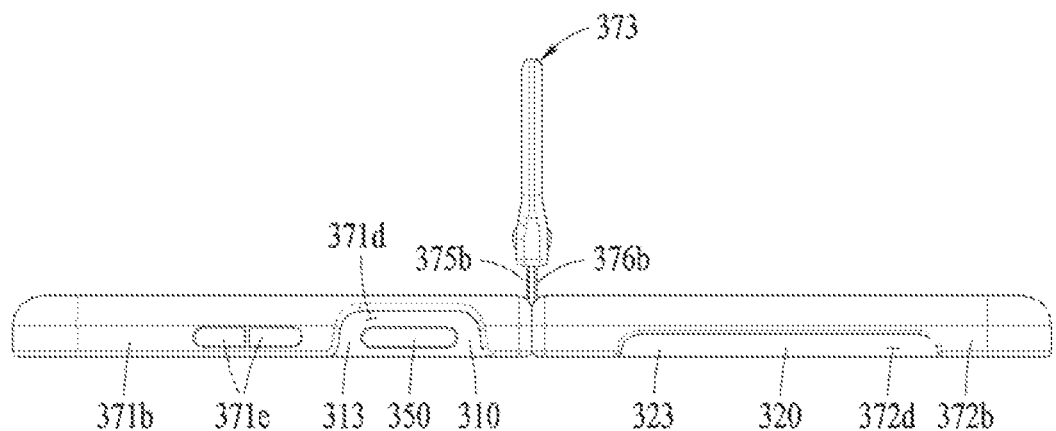
FIG. 3B is a side view of the electronic device in the unfolded state including the accessory according to an example embodiment.
Figure 3C:
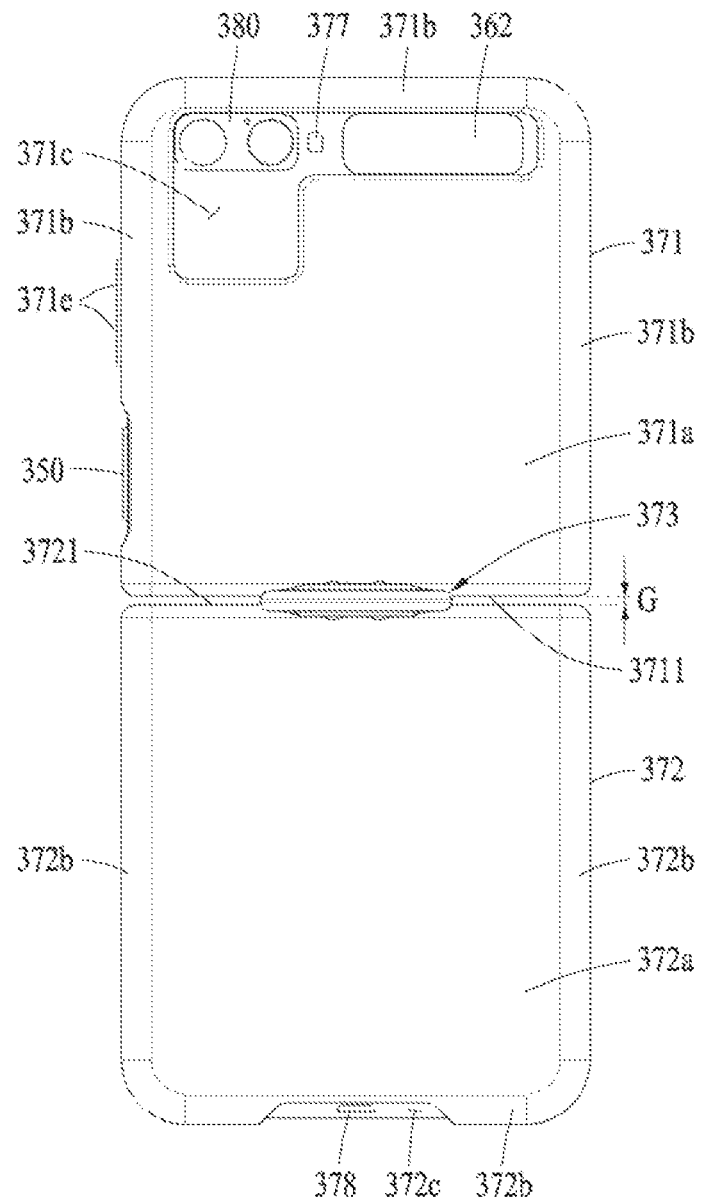
FIG. 3C is a plan view of the electronic device in the unfolded state including the accessory according to an example embodiment.
Figure 3D:
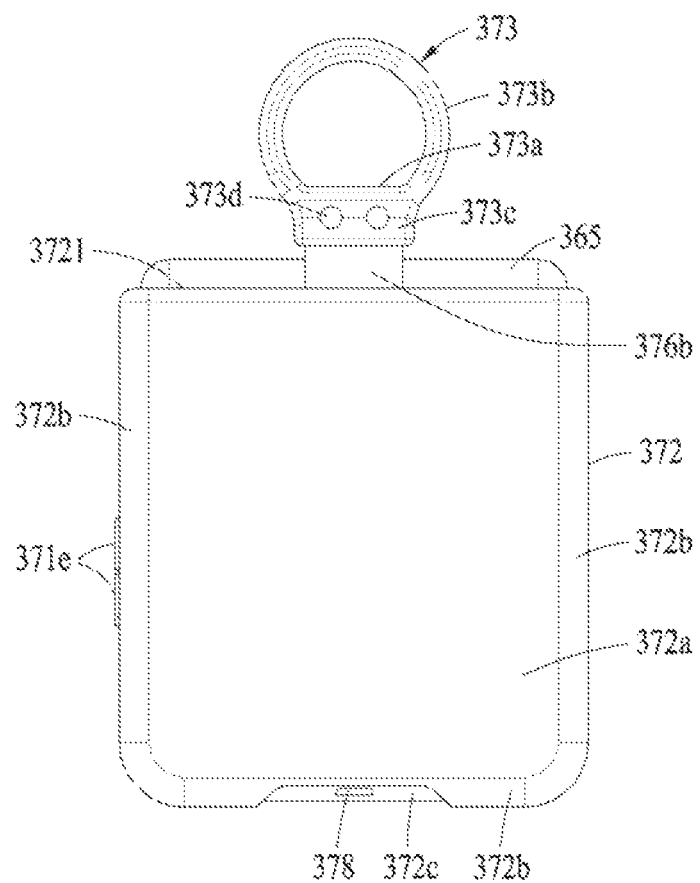
FIG. 3D is a plan view of the electronic device in a folded state including the accessory according to an example embodiment.
Figure 3E:
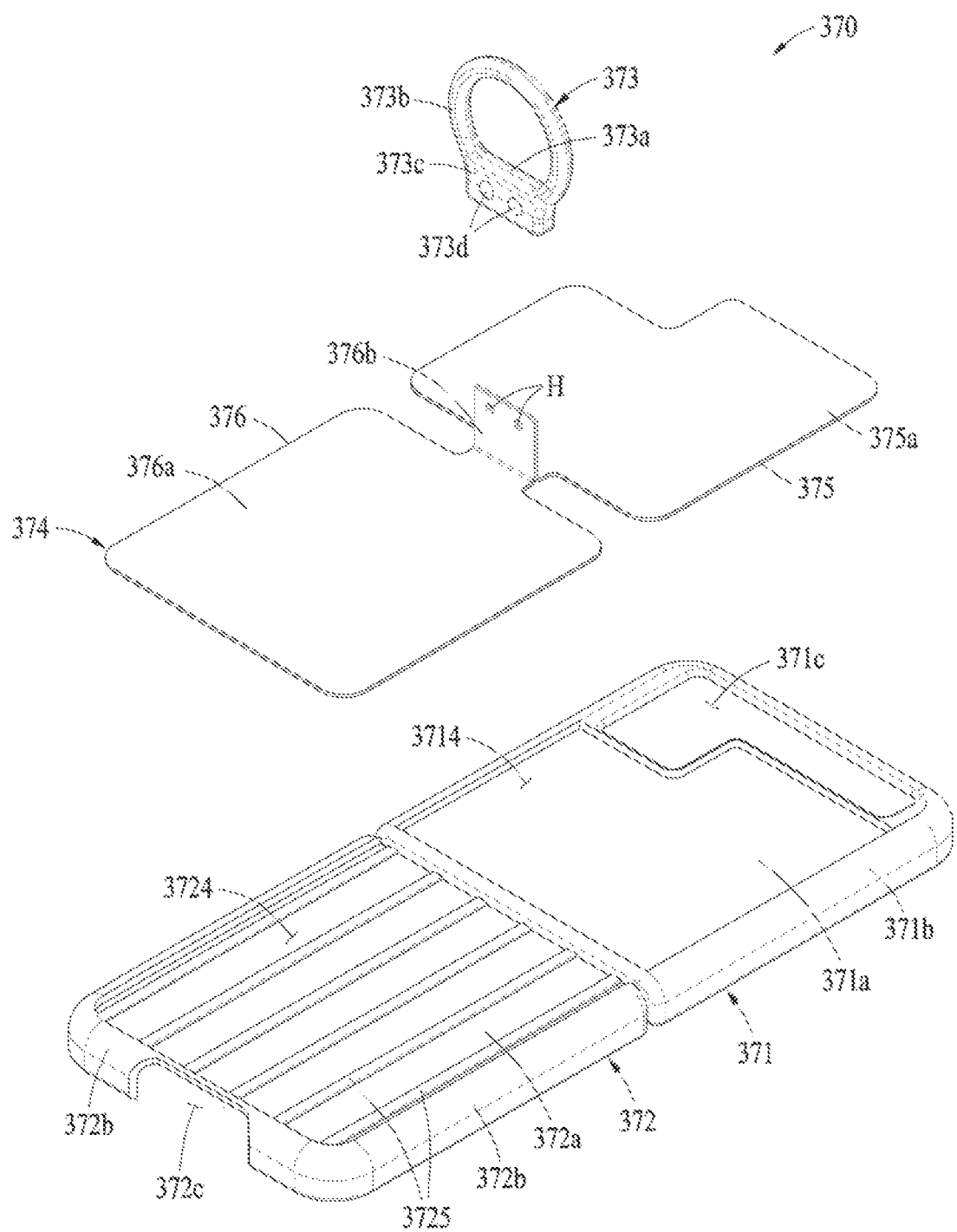
FIG. 3E is an exploded perspective view of the accessory according to an example embodiment.
Figure 3F:
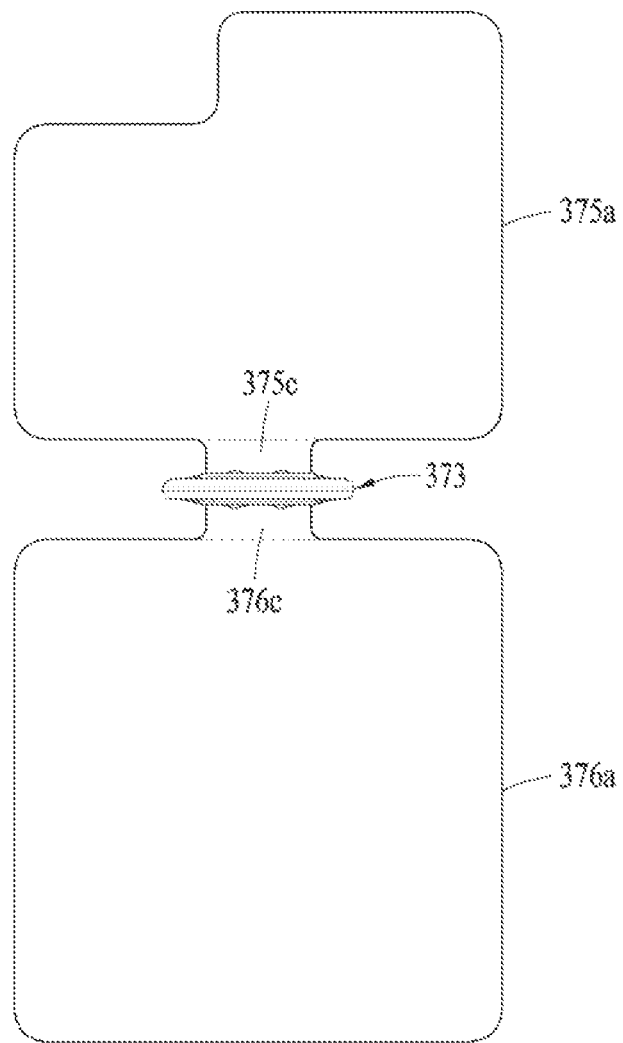
FIG. 3F is a plan view of a portion of a structure of the accessory according to an example embodiment.
Figure 3G:
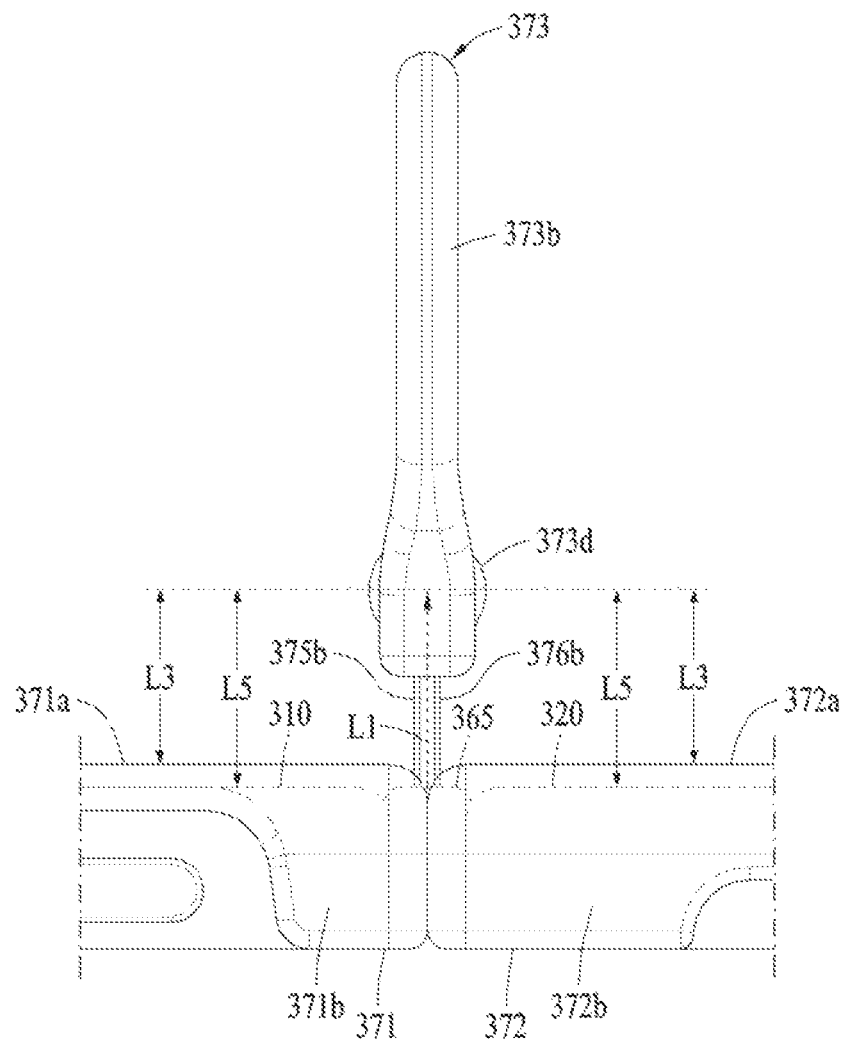
FIG. 3G is a side view of a portion of a structure of the electronic device in the unfolded state including the accessory according to an example embodiment.
Figure 3H:
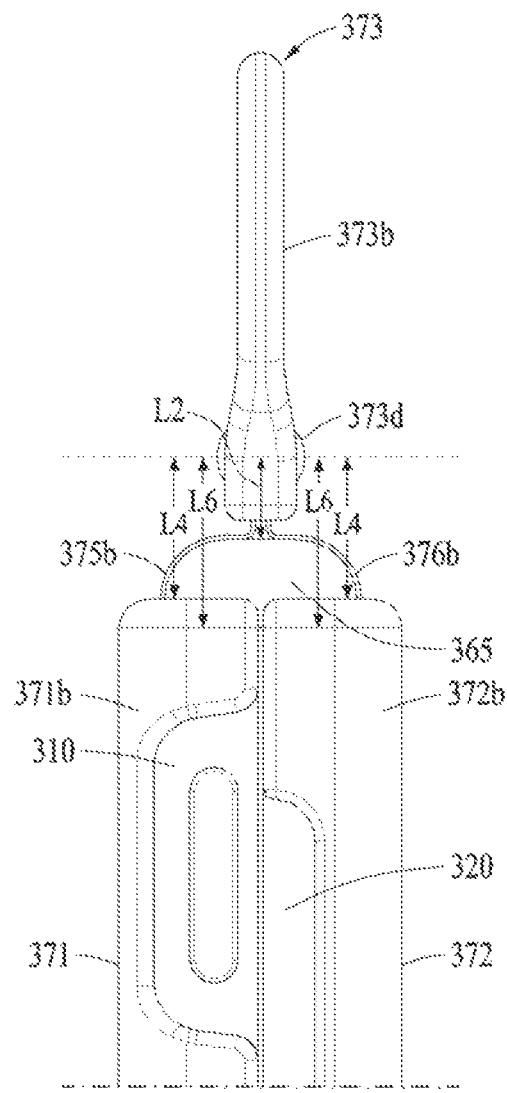
FIG. 3H is a side view of a portion of a structure of the electronic device in a folded state including the accessory according to an example embodiment.
Figure 3I:
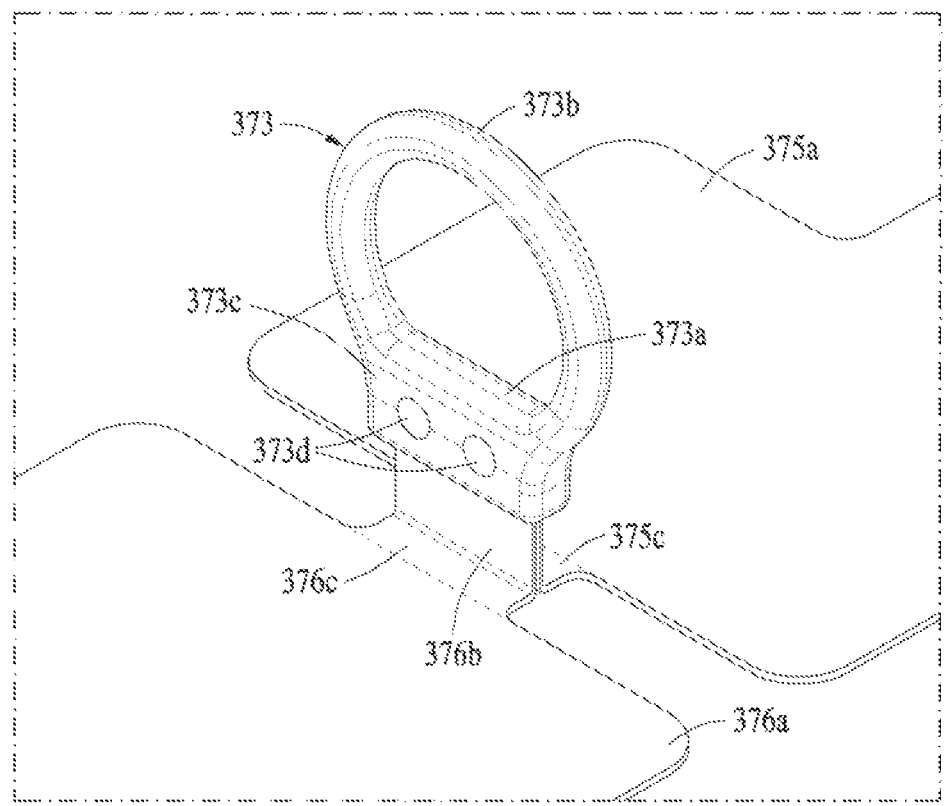
FIG. 3I is a perspective view of a portion of a structure of the accessory according to an example embodiment.
Figure 3J:
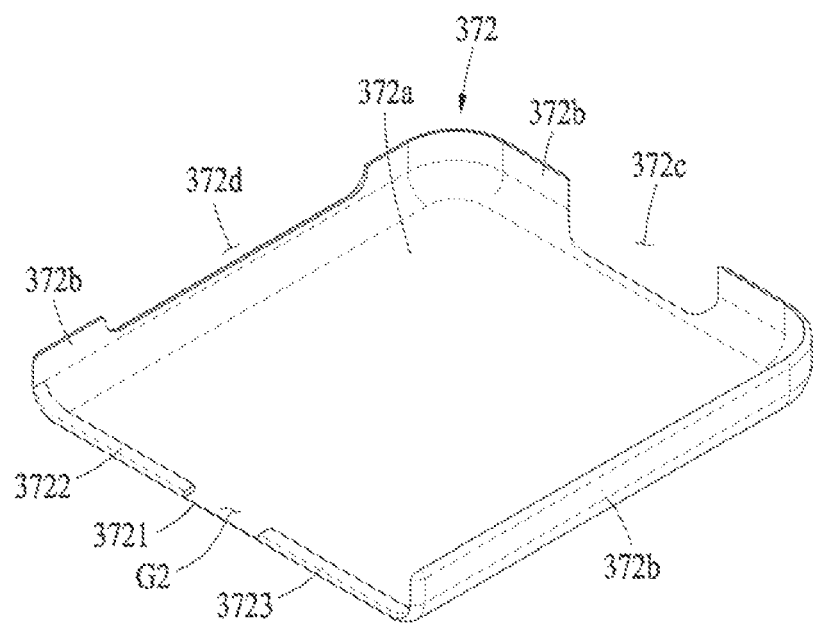
FIG. 3J is a perspective view of a cover from another direction according to an example embodiment.

In an example embodiment, the length of the first deformable portion 375b and the length of the second deformable portion 376b may be configured to substantially remain the same while the electronic device 301 changes between the unfolded state (e.g., FIG. 3G) and the folded state (e.g., FIG. 3H). In another example embodiment, when the electronic device 301 changes between the unfolded state (e.g., FIG. 3G) and the folded state (e.g., FIG. 3H), the length of the first deformable portion 375b and the length of the second deformable portion 376b may change.

In an example embodiment, the distance between the coupler 373d and the hinge cover 365 may vary between a first distance L1 (e.g., the perpendicular distance in FIG. 3G) when the electronic device 301 is in the unfolded state (e.g., FIG. 3G) and a second distance L2 (e.g., the perpendicular distance in FIG. 3H), which is less than the first distance L1, when the electronic device 301 is in the folded state (e.g., FIG. 3H). When the electronic device 301 changes between the unfolded state (e.g., FIG. 3G) and the folded state (e.g., FIG. 3H), the first deformable portion 375b and the second deformable portion 376b may implement the change in distance between the coupler 373d and the hinge cover 365.

In an example embodiment, the distance (e.g., separation distance) between the holder 373 and a cover (e.g., the first cover 371 or the second cover 372) may vary between a third distance L3 (e.g., the perpendicular distance between the coupler 373d and the first base 371a shown in FIG. 3G) when the electronic device 301 is in the unfolded state (e.g., FIG. 3G), and a fourth distance L4 (e.g., the perpendicular distance between the coupler 373d and an end portion surface of the first cover 371 or the perpendicular distance between the coupler 373d and an end portion surface of the second cover 372 shown in FIG. 3H), which is less than the third distance L3, when the electronic device 301 is in the folded state (e.g., FIG. 3H).

In an example embodiment, the distance (e.g., separation distance) of the holder 373 and a housing (e.g., the first housing 310 or the second housing 320) may vary between (i) a fifth distance L5 (e.g., in FIG. 3G, the perpendicular distance between the coupler 373d and a surface (e.g., the rear surface or the second surface 212) of the first housing 310 or the perpendicular distance between the coupler 373d and a surface (e.g., the rear surface or the fourth surface 222) of the second housing 320), when the electronic device 301 is in the unfolded state (e.g., FIG. 3G) and (ii) a sixth distance L6 (e.g., in FIG. 3H, the perpendicular distance between the coupler 373d and another surface (e.g., the end portion surface) of the first housing 310 or the perpendicular distance between the coupler 373d and another surface (e.g., the end portion surface) of the second housing 320), when the electronic device 301 is in the folded state (e.g., FIG. 3H). The sixth distance L6 is less than the fifth distance L5.

In an example embodiment, the first deformable portion 375b and the second deformable portion 376b may respectively include at least one hole H, which may be coupled to the coupler 373d. The at least one hole H of the first deformable portion 375b may be substantially aligned with the at least one hole H of the second deformable portion 376b.

In another example embodiment, the first deformable portion 375b and the second deformable portion 376b may be seamlessly integrated together to form a single deformable portion.

In an example embodiment, the length of the first deformable portion 375b, the length of the first neck 375c, the length of the second deformable portion 376b, and the length of the second neck 376c may be determined by a thickness (e.g., thickness of the first housing 310, thickness of the second housing 320, and/or thickness of the hinge cover 365) of the electronic device 301 and/or the shape of the electronic device 301. For example, a total length, which is a sum of the length of the first deformable portion 375b, the length of the first neck 375c, the length of the second deformable portion 376b, and the length of the second neck 376c, may be determined by Equation 1.

$$L = \frac{(A \times \pi)}{2} + B \quad \text{Equation 1}$$

Here, L may denote the total length, A may denote the thickness of the electronic device 301, when the electronic device 301 is in the folded state (e.g., FIG. 3H), and B may denote a constant based on the shape of the electronic device 301.

In an example embodiment, the first connector 375 and the second connector 376 may have any appropriate hardness, thickness, and/or width to prevent tearing when used.

In an example embodiment, at least a portion of the first connector 375 and at least a portion of the second connector 376 may be substantially transparent or opaque. For example, at least a portion of the first connector 375 and at least a portion of the second connector 376 may be made of thermoplastic polyurethane (TPU).

In an example embodiment, at least a portion of the first connector 375 and at least a portion of the second connector 376 may be made of polymer. For example, at least a portion of the first connector 375 and at least a portion of the second connector 376 may be made of polyethylene, polyvinyl chloride (PVC), and/or acrylonitrile butadiene styrene copolymer (ABS) resin.

In an example embodiment, at least a portion of the first connector 375 and at least a portion of the second connector 376 may be implemented as a flexible sheet. For example, at least a portion of the first connector 375 and at least a portion of the second connector 376 may be made of a carbon fibers sheet.

Figure 4A:
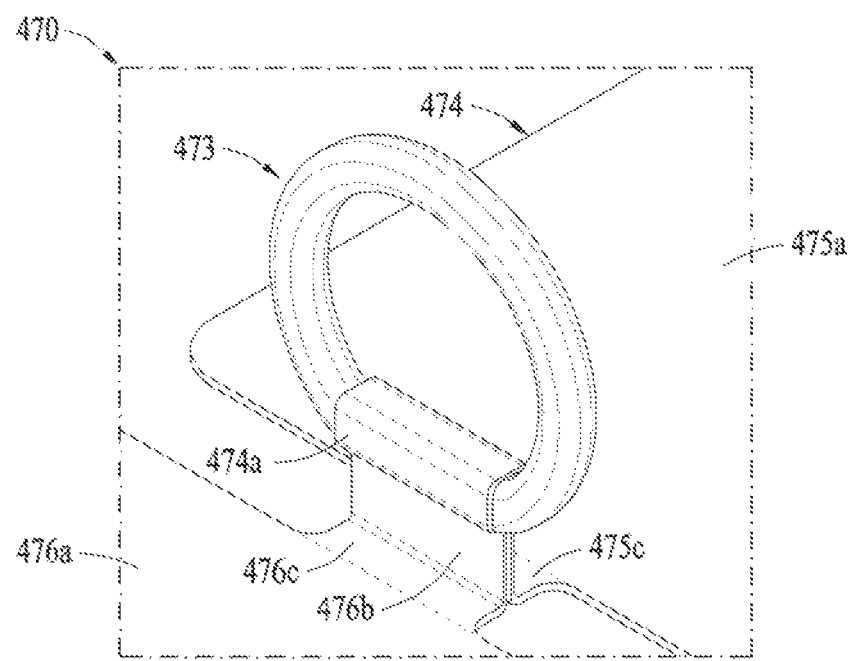
FIG. 4A is a perspective view of a portion of a structure of an accessory according to an example embodiment.

Referring to FIG. 4A, an accessory 470 (e.g., the accessory 370) may include a first cover (e.g., the first cover 371), a second cover (e.g., the second cover 372), a holder 473 (e.g., the holder 373), and a connector 474 (e.g., the connector 374). The connector 474 may include a first coupling portion 475a (e.g., the first coupling portion 375a), a second coupling portion 476a (e.g., the second coupling portion 376a), a first deformable portion (e.g., the first deformable portion 375b), a second deformable portion 476b (e.g., the second deformable portion 376b), a first neck 475c (e.g., the first neck 375c), a second neck 476c (e.g., the second neck 376c), and a wrapper 474a. The wrapper 474a may connect the first deformable portion to the second deformable portion 476b, and may enclose at least a portion (e.g., the linear portion 373a) of the holder 473. In an example embodiment, the wrapper 474a may be bonded (e.g., stitched, bonded) to at least a portion of the holder 473.

Figure 4B:
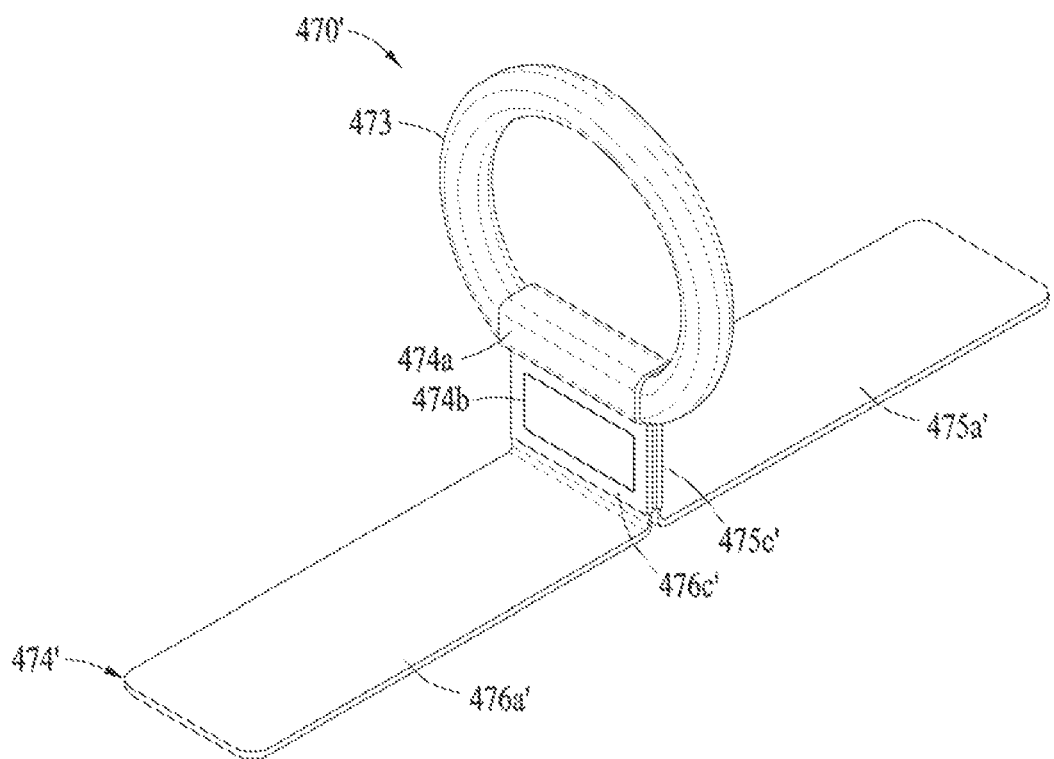
FIG. 4B is a perspective view of a portion of a structure of an accessory according to another example embodiment.

Referring to FIG. 4B, an accessory 470' (e.g., the accessory 370) may include a first cover (e.g., the first cover 371), a second cover (e.g., the second cover 372), the holder 473 (e.g., the holder 373), and a connector 474' (e.g., the connector 374). The connector 474' may include a first coupling portion 475a' (e.g., the first coupling portion 375a), a second coupling portion 476a' (e.g., the second coupling portion 376a), a first neck 475c' (e.g., the first neck 375c), a second neck 476c' (e.g., the second neck 376c), the wrapper 474a, and a stitch 474b.

In an example embodiment, the connector 474' may not include a deformable portion (e.g., the first deformable portion 375b and the second deformable portion 376b) configured to deform based on changes in the state of an electronic device (e.g., the electronic device 301). In another example embodiment, the connector 474' may include a first deformable portion (e.g., the first deformable portion 375b) between the first coupling portion 475a' and the first neck 475c', and a second deformable portion (e.g., the second deformable portion 376b) between the second coupling portion 476a' and the second neck 476c'.

In an example embodiment, the first coupling portion 475a' and the first neck 475c' may have substantially the same width. In another example embodiment, the first coupling portion 475a' and the first neck 475c' may have different widths. In an example embodiment, the second coupling portion 476a' and the second neck 476c' may have substantially the same width. In another example embodiment, the second coupling portion 476a' and the second neck 476c' may have different widths.

In an example embodiment, the stitch 474b may bond at least a portion of the first neck 475c' to at least a portion of the second neck 476c'. This may improve durability of the connector 474' as the user continuously and/or repeatedly uses the holder 473. In an example embodiment, the stitch 474b may further bond at least a portion of the first neck 475c' to at least a portion of the second neck 476c' after a portion of the first neck 475c' is bonded to a portion of the second neck 476c' by a different method (e.g., thermocompression bonding).

Figure 4C:
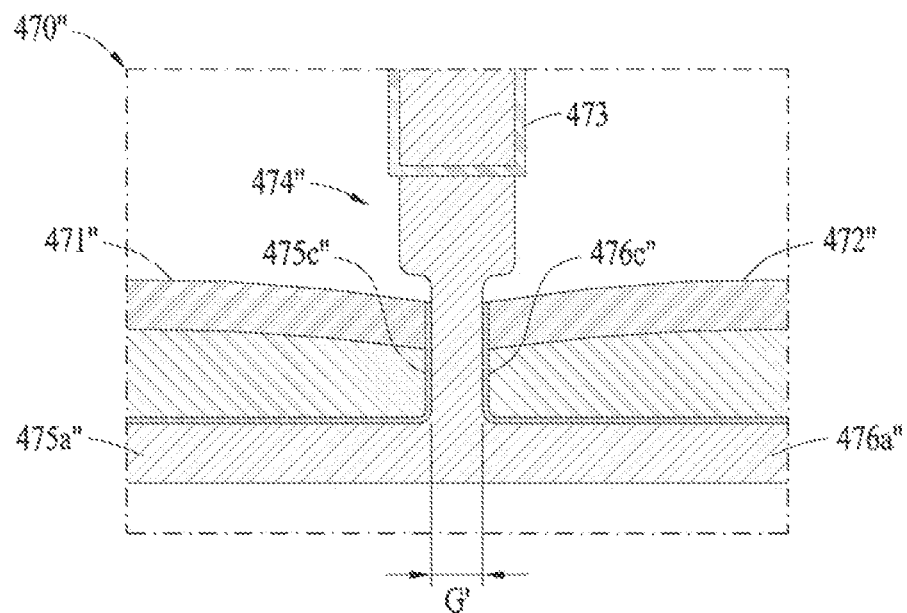
FIG. 4C is a side view of a portion of a structure of an accessory according to another example embodiment.

Referring to FIG. 4C, an accessory 470" (e.g., the accessory 370) may include a first cover 471" (e.g., the first cover 371), a second cover 472" (e.g., the second cover 372), the holder 473 (e.g., the holder 373), and a connector 474" (e.g., the connector 374). The connector 474" may include a first coupling portion 475a" (e.g., the first coupling portion 375a), a second coupling portion 476a" (e.g., the second coupling portion 376a), a first neck 475c" (e.g., the first neck 375c), and a second neck 476c" (e.g., the second neck 376c).

In an example embodiment, the connector 474" may not include a deformable portion (e.g., the first deformable portion 375b and the second deformable portion 376b) configured to deform based on changes in the state of an electronic device (e.g., the electronic device 301). In another example embodiment, the connector 474" may include a first deformable portion (e.g., the first deformable portion 375b) between the first coupling portion 475a" and the first neck 475c", and a second deformable portion (e.g., the second deformable portion 376b) between the second coupling portion 476a" and the second neck 476c".

In an example embodiment, the first neck 475c" and the second neck 476c" may be bonded by thermocompression bonding. When the first neck 475c" and the second neck 476c", each having a first thickness, are bonded by thermocompression bonding, an integrated bonding structure of the first neck 475c" and the second neck 476c" having a reduced second thickness less than the first thickness (e.g., approximately half of the first thickness) may be formed. After thermocompression bonding, a reduced gap G' may be formed between the first cover 471" and the second cover 472", or the gap G' may be substantially eliminated between the first cover 471" and the second cover 472".

Figure 5A:
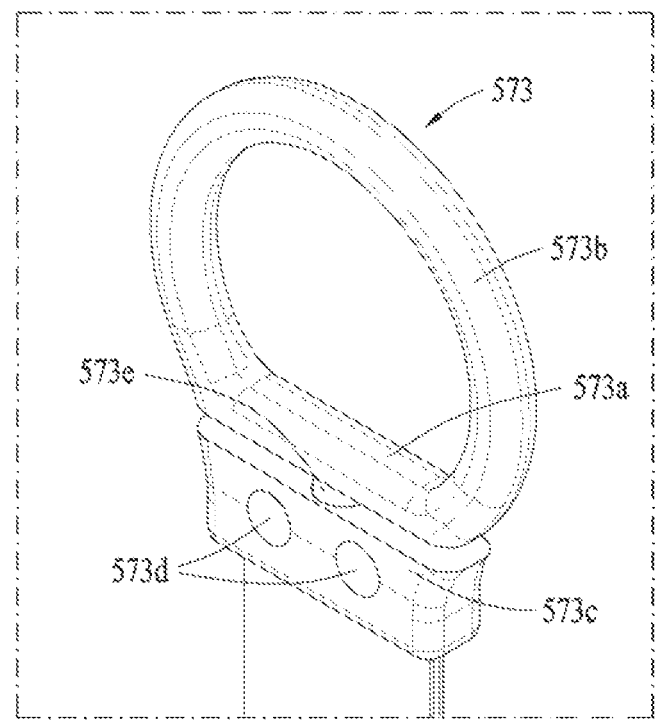
FIG. 5A is a perspective view of a holder in a first state in an accessory according to an example embodiment.
Figure 5B:
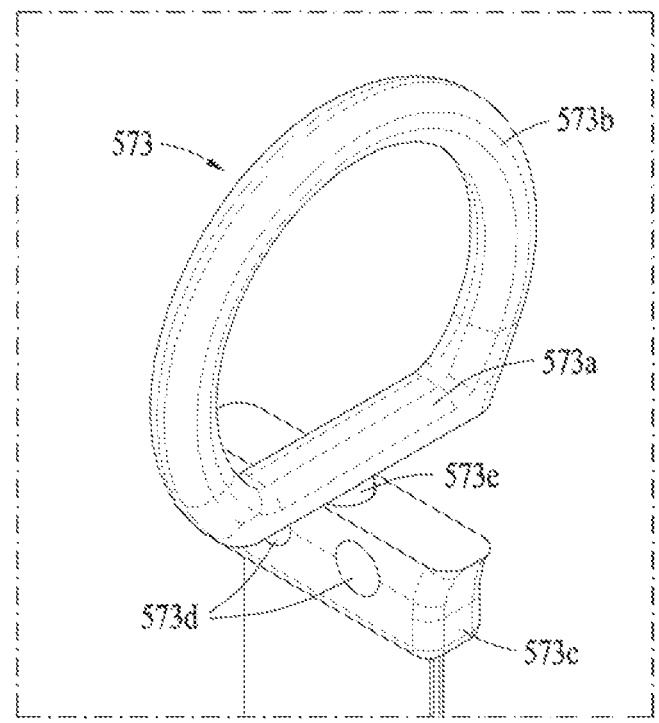
FIG. 5B is a perspective view of a holder in a second state in an accessory according to an example embodiment.

Referring to FIGS. 5A and 5B, a holder 573 (e.g., the holder 373) may include a linear portion 573a (e.g., the linear portion 373a), a curved portion 537b (e.g., the curved portion 373b), a coupling portion 573c (e.g., the coupling portion 373c), at least one coupler 573d (e.g., the coupler 373d), and a shaft 573e. The shaft 573e may connect the linear portion 573a to the coupling portion 573c, and may allow the linear portion 573a to be rotated about the coupling portion 573c. In an example embodiment, the shaft 573e may be connected to the linear portion 573a such that the shaft 573e may be rotated together with the linear portion 573a, and may be coupled to the coupling portion 573c such that the shaft 573e is stationary with respect to the coupling portion 573c. The structure described above may support for easy gripping of an accessory (e.g., the accessory 370) and/or an electronic device (e.g., the electronic device 301) by the user because the closed loop structure may rotate when the user inserts a finger into the closed loop structure (e.g., substantially ring structure) formed by the linear portion 573a and the curved portion 537b. Meanwhile, the closed loop structure is not limited to the illustrated example, and may have various shapes (e.g., polygonal shape) that supports easy gripping by the user.

Figure 6A:
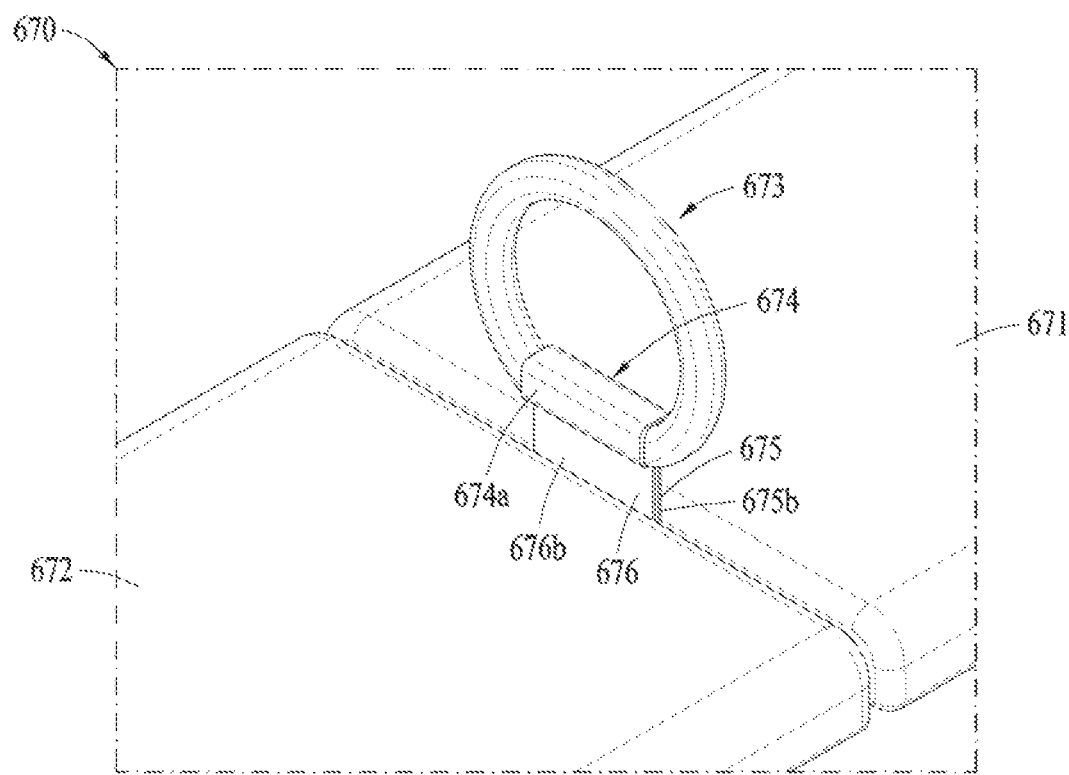
FIG. 6A is a perspective view of a portion of a structure of an accessory according to an example embodiment.
Figure 6B:
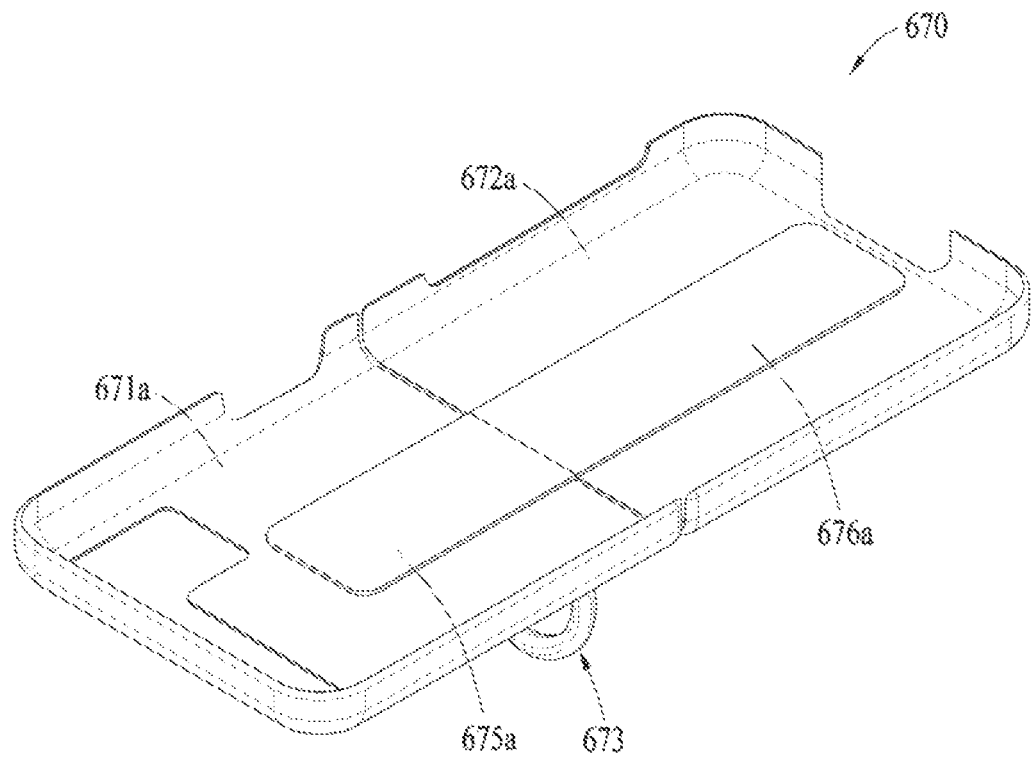
FIG. 6B is a perspective view of the portion of the structure of the accessory from another direction according to an example embodiment.

Referring to FIGS. 6A and 6B, an accessory 670 (e.g., the accessory 370) may include a first cover 671 including a first base surface 671a (e.g., the first base surface 371a), a second cover 672 including a second base surface 672a (e.g., the second base surface 372a), a holder 673 (e.g., the holder 373), and a connector 674 (e.g., the connector 374). The holder 673 and the connector 674 may be integrally formed with the first cover 671 and the second cover 672. In an example embodiment, the connector 674 may include a first coupling portion 675a (e.g., the first coupling portion 375a) attached to the first base surface 671a, a second coupling portion 676a (e.g., the second coupling portion 376a) attached to the second base surface 672a, a first deformable portion 675b (e.g., the first deformable portion 375b), a second deformable portion 676b (e.g., the second deformable portion 376b), and a wrapper 674a (e.g., the wrapper 474a). The first coupling portion 675a, the second coupling portion 676a, the first deformable portion 675b, the second deformable portion 676b, and the wrapper 674a may be seamlessly integrated with each other. In an example embodiment, the holder 673 and the connector 674 may be made of different materials. For example, the holder 673 may be made of metal, an injection material (e.g., PC, TPU, and ABS), or any other appropriate rigid material, however, the connector 674 may be made of silicone, TPU, plastics with a leather texture, leather, or any other appropriate material. In another example embodiment, the holder 673 and the connector 674 may be substantially the same material. In an example embodiment, the first coupling portion 675a may be attached to a portion of the first base surface 671a, and the second coupling portion 676a may be attached to a portion of the second base surface 672a.

In an example embodiment, an adhesive member (e.g., bonding member such as double-sided tape) may be disposed between the first coupling portion 675a and the first base surface 671a and/or between the second coupling portion 676a and the second base surface 672a.

Figure 7A:
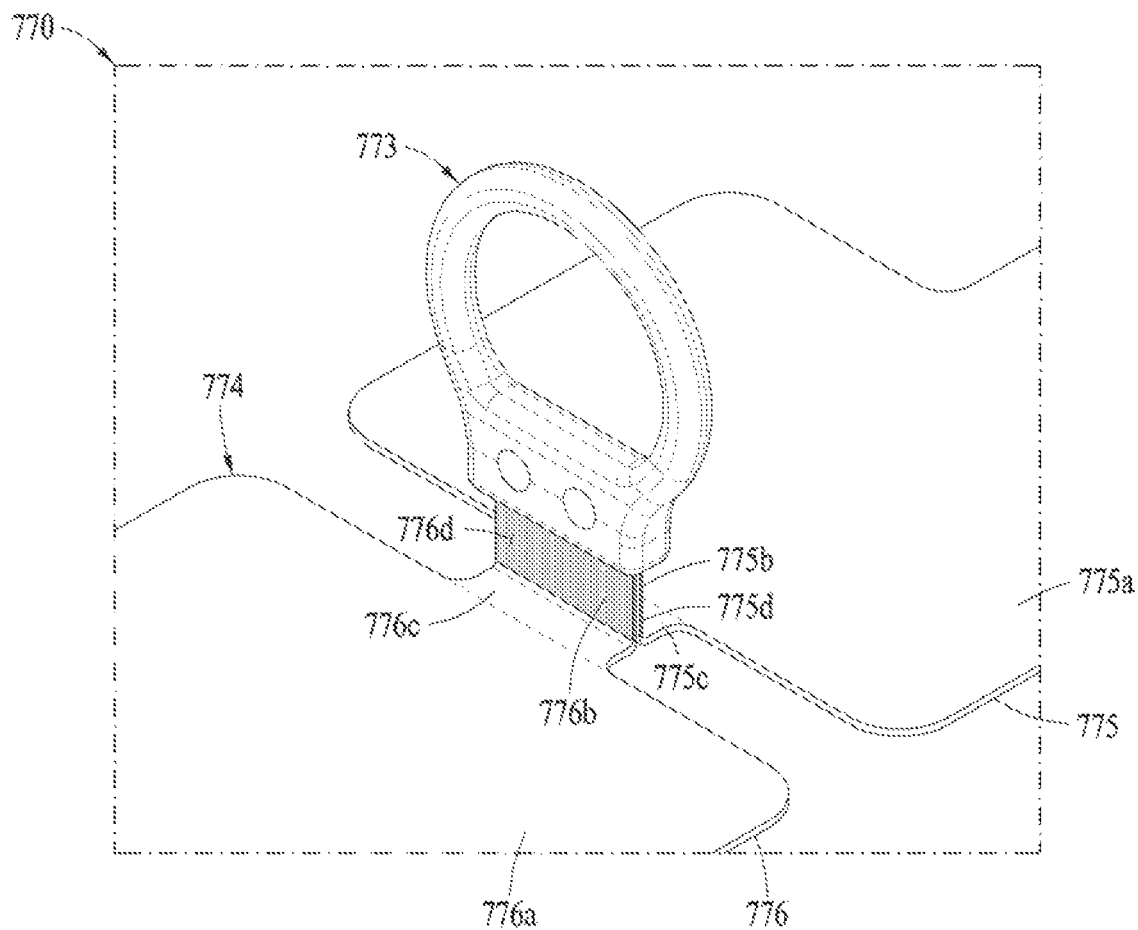
FIG. 7A is a perspective view of a portion of a structure of an accessory according to an example embodiment.
Figure 7B:
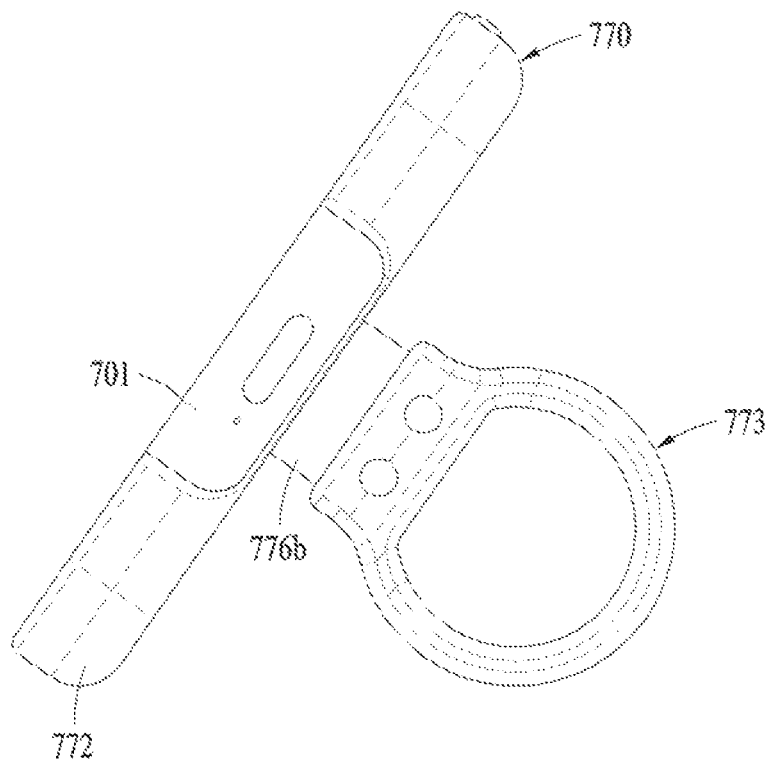
FIG. 7B is a view of an electronic device including an accessory according to an example embodiment.

Referring to FIGS. 7A and 7B, an accessory 770 (e.g., the accessory 370) for an electronic device 701 (e.g., the electronic device 301) may include a first cover (e.g., the first cover 371), a second cover 772 (e.g., the second cover 372), a holder 773 (e.g., the holder 373), and a connector 774 (e.g., the connector 374). The connector 774 may include a first connector 775 (e.g., the first connector 375) and a second connector 776 (e.g., the second connector 376). The first connector 775 may include a first coupling portion 775a (e.g., the first coupling portion 375a), a first deformable portion 775b (e.g., the first deformable portion 375b), and a first neck 775c (e.g., the first neck 375c). The second connector 776 may include a second coupling portion 776a (e.g., the second coupling portion 376a), a second deformable portion 776b (e.g., the second deformable portion 376b), and a second neck 776c (e.g., the second neck 376c).

In an example embodiment, at least a portion of the first deformable portion 775b and the second deformable portion 776b may be made of a first material, and at least a portion of the first coupling portion 775a, the first neck 775c, the second coupling portion 776a, and the second neck 776c may be made of a second material different from the first material. For example, the hardness of the first material may be greater than the hardness of the second material. The material characteristic of the first deformable portion 775b and the second deformable portion 776b may allow the accessory 770 to become a stable pedestal or stand for the electronic device 701 when the electronic device 701 is tilted and placed on a flat surface such as a table or the ground.

In an example embodiment, the first connector 775 may include the first reinforcing portion 775d placed on at least a portion of the first deformable portion 775b. The first reinforcing portion 775d may be attached to at least a portion of the first deformable portion 775b. The second connector 776 may include a second reinforcing portion 776d placed on at least a portion of the second deformable portion 776b.

The second reinforcing portion 776d may be attached to at least a portion of the second deformable portion 776b. The first reinforcing portion 775d may reinforce the first deformable portion 775b, the second reinforcing portion 776d may reinforce the second deformable portion 776b, and thus, the first reinforcing portion 775d and the second reinforcing portion 776d may support stable pedestal or stand for the electronic device 701 when the electronic device 701 is tilted and placed on a flat surface. In an example embodiment, the first reinforcing portion 775d and the second reinforcing portion 776d may be made of substantially the same material (e.g., TPU) as the first deformable portion 775b and the second deformable portion 776b. However, the example is not limited thereto, and the material forming the first reinforcing portion 775d, the second reinforcing portion 776d, the first deformable portion 775b, and the second deformable portion 776b may be any material appropriate to support stable pedestal or stand for the electronic device 701, or a combination thereof.

In an example embodiment, at least a portion of the first connector 775 and at least a portion of the second connector 776 may have the appropriate thickness and/or hardness for supporting stable pedestal or stand for the electronic device 701.

Figure 8A:
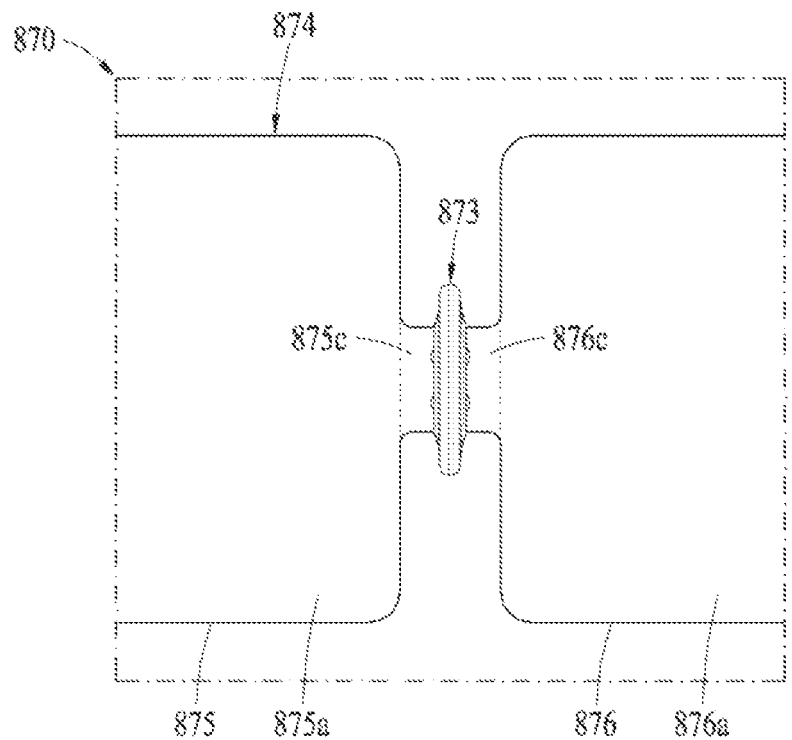
FIG. 8A is a plan view of a portion of a structure of an accessory according to an example embodiment.
Figure 8B:
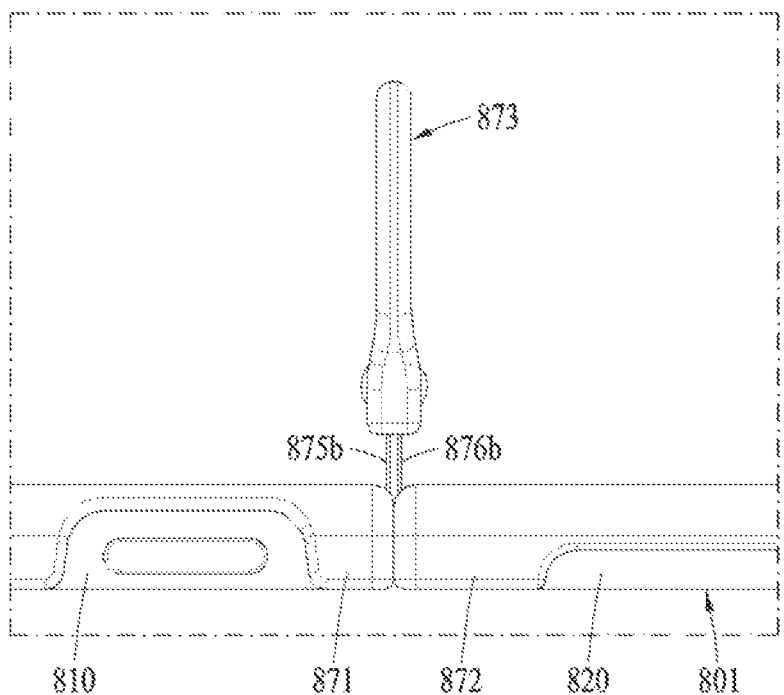
FIG. 8B is a side view of a portion of a structure of an electronic device including an accessory in a first state according to an example embodiment.
Figure 8C:
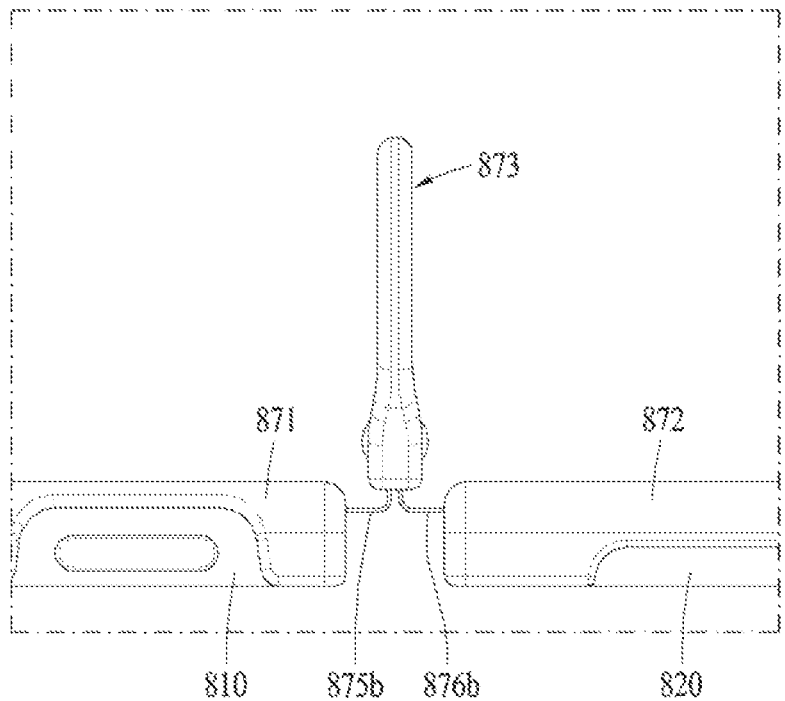
FIG. 8C is a side view of a portion of a structure of an electronic device including an accessory in a second state according to an example embodiment.

Referring to FIGS. 8A to 8C, an accessory 870 (e.g., the accessory 370) of an electronic device 801 may include a first cover 871 (e.g., the first cover 371), a second cover 872 (e.g., the second cover 372), a holder 873 (e.g., the holder 373), and a connector 874 (e.g., the connector 374). The connector 874 may include a first connector 875 (e.g., the first connector 375) and a second connector 876 (e.g., the second connector 376). The first connector 875 may include a first coupling portion 875a (e.g., the first coupling portion 375a), a first deformable portion 875b (e.g., the first deformable portion 375b), and a first neck 875c (e.g., the first neck 375c). The second connector 876 may include a second coupling portion 876a (e.g., the second coupling portion 376a), a second deformable portion 876b (e.g., the second deformable portion 376b), and a second neck 876c (e.g., the second neck 376c).

The electronic device 801 according to an example embodiment, may include a first housing 810 (e.g., the first housing 310) and a second housing 820 (e.g., the second housing 320), which are spaced apart from each other and configured to slide with respect to each other. The first housing 810 and the second housing 820 may be slid between a first position (e.g., FIG. 8B) in which the first housing 810 and the second housing 820 are relatively close to each other and are spaced apart from each other by a first distance, and a second position (e.g., FIG. 8C) in which the first housing 810 and the second housing 820 are relatively farther apart from each other and spaced apart from each other by a second distance than the first distance.

In an example embodiment, when the first housing 810 and the second housing 820 are placed at the first position (e.g., FIG. 8B), the first deformable portion 875b and the second deformable portion 876b may substantially face each other. In an example embodiment, when the first housing 810 and the second housing 820 are placed at the first position (e.g., FIG. 8B), the first deformable portion 875b and the second deformable portion 876b may substantially parallel with each other.

In an example embodiment, when the first housing 810 and the second housing 820 are placed at the second position (e.g., FIG. 8C), the first deformable portion 875b and the second deformable portion 876b may be bent into a space between the first housing 810 and the second housing 820.

In an example embodiment, when the first housing 810 and the second housing 820 are placed at the second position (e.g., FIG. 8C), a normal direction of a least a portion of the first deformable portion 875b and a normal direction of at least a portion of the second deformable portion 876b may be substantially parallel with each other. In an example embodiment, when the first housing 810 and the second housing 820 are placed at the second position (e.g., FIG. 8C), at least a portion of the first deformable portion 875b and at least a portion of the second deformable portion 876b may be placed on substantially the same plane.

Figure 9A:
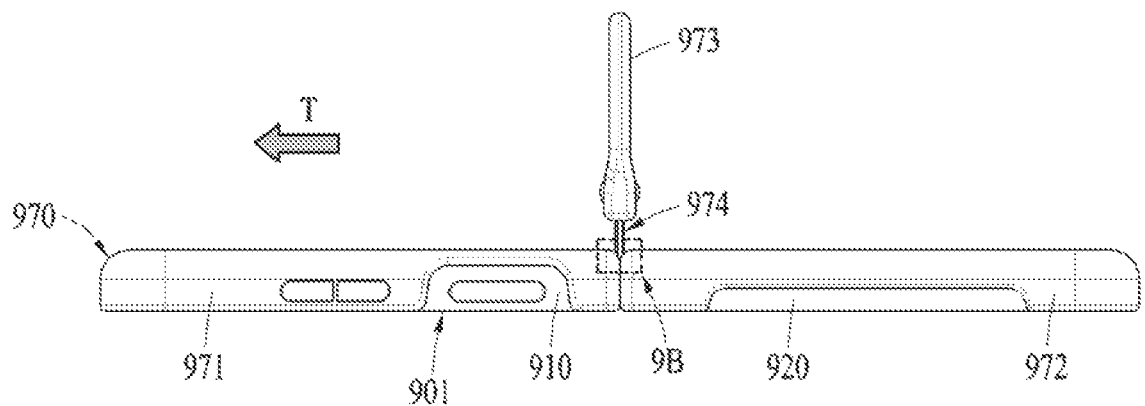
FIG. 9A is a side view of an electronic device in an unfolded state including an accessory according to an example embodiment.
Figure 9B:
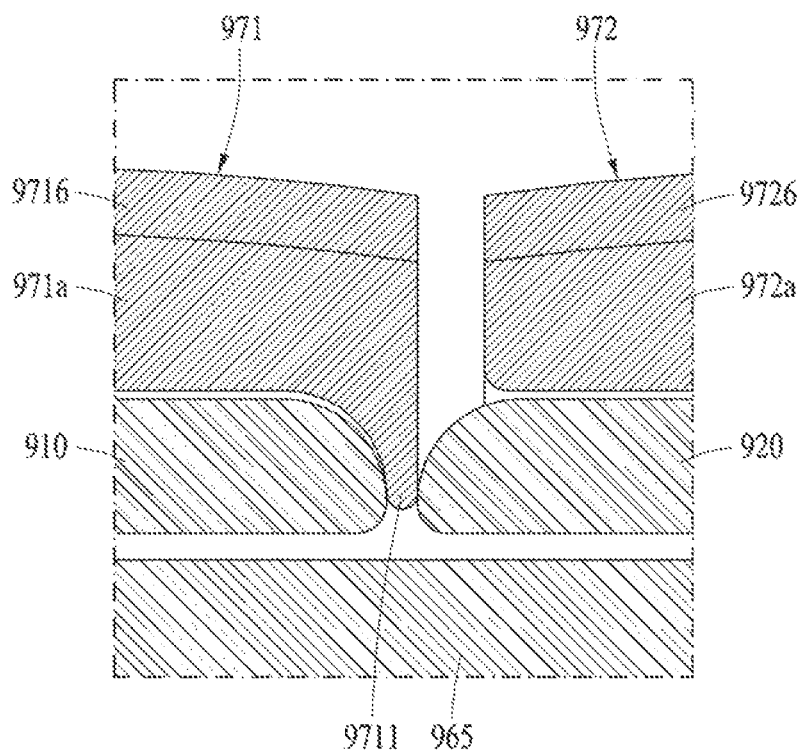
FIG. 9B is an enlarged cross-sectional view of the accessory of FIG. 9A according to an example embodiment.
Figure 9C:
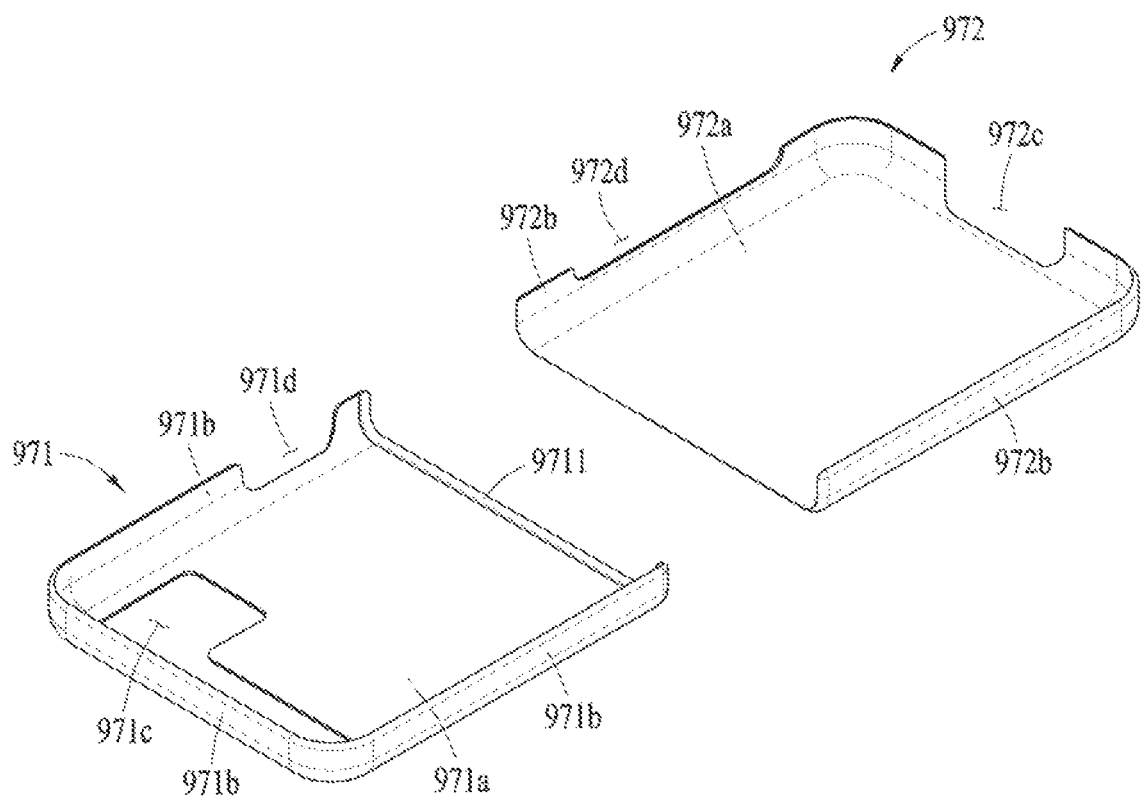
FIG. 9C is a perspective view of a first cover of the accessory of FIG. 9A from another direction according to an example embodiment.

Referring to FIGS. 9A to 9C, an electronic device 901 (e.g., the electronic device 301) may include a first housing 910 (e.g., the first housing 310), a second housing 920 (e.g., the second housing 320), and a hinge cover 965 (e.g., the hinge cover 365). An accessory 970 (e.g., the accessory 370) for the electronic device 901 may include a first cover 971 (e.g., the first cover 371), a second cover 972 (e.g., the second cover 372), a holder 973 (e.g., the holder 373), and a connector 974 (e.g., the connector 374).

The first cover 971 may include a first base surface 971a (e.g., the first base surface 371a) and a plurality of first side surfaces 971b (e.g., the first side surfaces 371b). In an example embodiment, the first cover 971 may include a first slot 971c (e.g., the first slot 371c). In an example embodiment, the first cover 971 may include a second slot 971d (e.g., the second slot 371d). In an example embodiment, the first cover 971 may include a first lid 9716 (e.g., the first lid 3716). The second cover 972 may include a second base surface 972a (e.g., the second base surface 372a) and a plurality of second side surfaces 972b (e.g., the second side surfaces 372b). In an example embodiment, the second cover 972 may include a first notch 972c (e.g., the first notch 372c) and/or the second notch 972d (e.g., the second notch 372d). In an example embodiment, the second cover 972 may include a second lid 9726 (e.g., the second lid 3726).

In an example embodiment, the first cover 971 may be fixed to the first housing 910 via a first suction pad (not shown) when the first cover 971 is assembled with the first housing 910. In an example embodiment, the second cover 972 may be fixed to the second housing 920 via a second suction pad (not shown) when the second cover 972 is assembled with the second housing 920.

In an example embodiment, the first cover 971 may include a rib 9711 configured to prevent or reduce escape of the first cover 971 from the first housing 910. The rib 9711 may restrict or delay sliding of the first cover 971 with respect to the first housing 910. For example, the rib 9711 may restrict or delay sliding of the first cover 971 away from the second cover 972 in the direction T shown in FIG. 9A. The rib 9711 may reduce wear on the first suction pad (not shown) that may be used for the first cover 971. In addition, when the first cover 971 is mounted on the housing 910, the rib 9711 may reduce or remove misalignment of the first cover 971 with respect to the first housing 910.

In an example embodiment, the rib 9711 may be at least partially formed on the first base surface 971a and/or at least one of the pair of first side surfaces 971b positioned at two sides of the first base surface 971a. In an example embodiment, the rib 9711 may be at least partially formed along the edge (e.g., an end base edge facing the second cover 972 or an edge of the first base surface 971a to which the first side surfaces 971b are not connected) of the first base surface 971a and/or the edge (e.g., an end side edge facing the second cover 972) of at least one of the pair of side surfaces 971b. In an example embodiment, the rib 9711 may be at least partially positioned in a gap between the first housing 910 and the second housing 920.

The accessory 370 according to an example embodiment may be for the electronic device 301 including the first housing 310, the second housing 320, the hinge cover 365 connecting the first housing 310 to the second housing 320, and may include the first cover 371 to cover the first housing 310, the second cover 372 to cover the second housing 320, the holder 373 configured to receive a body part of the user to hold the electronic device 301, and the connector 374 connecting the holder 373 to the first cover 371 and the second cover 372, and the connector 374 may be configured to have a first shape in an unfolded state of the electronic device 301, and have a second shape different from the first shape in a folded state of the electronic device 301. At least a portion of the connector 374 may be deformed in the second shape.

In an example embodiment, the connector 374 may include the first deformable portion 375b disposed between the first cover 371 and the holder 373, and the second deformable portion 376b disposed between the second cover 372 and the holder 373.

In an example embodiment, the first deformable portion 375b and the second deformable portion 376b may be configured to enclose at least a portion of the hinge cover 365 in the folded state.

In an example embodiment, the first deformable portion 375b and the second deformable portion 376b may be configured to face each other in the unfolded state.

In an example embodiment, the first deformable portion 375b and the second deformable portion 376b may be configured to be bent outwardly in the folded state.

In an example embodiment, the connector 374 may include the first coupling portion 375a connected to the first deformable portion 375b and coupled to the first cover 371, and the second coupling portion 376a connected to the second deformable portion 376b and coupled to the second cover 372.

In an example embodiment, the first coupling portion 375a may be detachably coupled to the first cover 371, and the second coupling portion 376a may be detachably coupled to the second cover 372.

In an example embodiment, the first cover 371 may include a first recess 3714 configured to be coupled by interference fit to the first coupling portion 375a, and the second cover 372 may include a second recess 3724 configured to be coupled by interference fit to the second coupling portion 376a.

In an example embodiment, the accessory 370 may further include the rivet 373d configured to couple the holder 373 to the connector 374.

In an example embodiment, the connector 474 may further include the wrapper 474a connecting the first deformable portion 375b to the second deformable portion 376b or 476b, enclosing at least a portion of the holder, and configured to be coupled to the holder.

In an example embodiment, the connector may include the first coupling portion coupled to the first cover, the second coupling portion coupled to the second cover, the first neck disposed between the holder and the first coupling portion, the second neck disposed between the holder and the second coupling portion, and the stitch coupling the first neck to the second neck.

In an example embodiment, the connector may include the first coupling portion coupled to the first cover, the second coupling portion coupled to the second cover, the first neck disposed between the holder and the first coupling portion, and the second neck disposed between the holder and the second coupling portion, and the first neck and the second neck may be thermocompression bonded to each other.

In an example embodiment, the holder 373 or 573 may be configured to rotate on a connecting portion disposed between the holder 573 and the connector 374.

In an example embodiment, the holder 673 and the connector 674 may be integrated with the first cover 671 and the second cover 672.

In an example embodiment, the first deformable portion 775*b* and the second deformable portion 776*b* may be made of a first material, and the first coupling portion 775*a* and the second coupling portion 776*a* may be made of a second material different from the first material.

In an example embodiment, the hardness of the first material may be greater than the hardness of the second material.

In an example embodiment, the accessory 770 may further include the first reinforcing portion 775*d* and the second reinforcing portion 776*d* attached to the first deformable portion 775*b* and the second deformable portion 776*b*, respectively.

In an example embodiment, the first cover 971 may further include the first base surface 971*a*, the plurality of first side surfaces 971*b* connected to some edges of the edges of the first base surface 971*a*, and the rib 9711 formed at the edge of first base surface 971*a* and/or the edge of at least one of the pair of side surfaces 971*a* and 971*b* positioned on two sides of the first base surface 971*a*.

The electronic device 301 according to an example embodiment may include the first housing 310, the second housing 320, the hinge cover 365 connecting the first housing 310 to the second housing 320, and the accessory 370 including the first cover 371 to cover the first housing 310, the second cover 372 to cover the second housing 320, the holder 373 configured to receive a body part of a user, and the connector 374 connecting the holder to the first cover 371 and the second cover 372, and the connector 374 may be configured to have a first shape in an unfolded state of the electronic device 301, and have a second shape different from the first shape in a folded state of the electronic device 301. At least a portion of the connector 374 may be deformed in the second shape.

In an example embodiment, the connector 374 may include the first deformable portion 375*b* disposed between the first cover 371 and the holder 373, and the second deformable portion 376*b* disposed between the second cover 372 and the holder 373.

In an example embodiment, the first deformable portion 375*b* and the second deformable portion 376*b* may be configured to enclose at least a portion of the hinge cover 365 in the folded state.

In an example embodiment, the first deformable portion 375*b* and the second deformable portion 376*b* may be configured to face each other in the unfolded state, and may be configured to be bent outwardly in the folded state.

The electronic device 801 according to an example embodiment may include the first housing 810, the second housing 820, and the accessory 870 including the first cover 871 to cover the first housing 810, the second cover 872 to cover the second housing 820, the holder 873 configured to receive a body part of the user, the connector 874 connecting the holder 873 to the first cover 871 and the second cover 872, and the first housing 810 and the second housing 820 may be configured to slide between a first position in which the first housing 810 and the second housing 820 are spaced apart by a first distance and a second position in which the first housing 810 and the second housing 820 are spaced apart by a second distance greater than the first distance, and the connector 874 may be configured to have a first shape at the first position and have a second shape different from the first shape at the second position. At least a portion of the connector 874 may be deformed in the second shape.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An accessory for an electronic device comprising a first housing, a second housing, a hinge cover connecting the first housing to the second housing, the accessory comprising:
   a first cover configured to cover the first housing;
   a second cover configured to cover the second housing;
   a holder configured to receive a body part of a user; and
   a connector having a first deformable portion and a second deformable portion, the first deformable portion connecting the holder to the first cover and the second deformable portion connecting the holder to the second cover, wherein the connector is configured to have a first shape in an unfolded state of the electronic device, and have a second shape different from the first shape in a folded state of the electronic device, and
   wherein surfaces of the first deformable portion and the second deformable portion have a substantially the same shape during the folded and unfolded states of the electronic device.

2. The accessory of claim 1, wherein the connector further comprises:
   the first deformable portion disposed between the first cover and the holder; and
   the second deformable portion disposed between the second cover and the holder.

3. The accessory of claim 2, wherein the first deformable portion and the second deformable portion are configured to enclose at least a portion of the hinge cover in the folded state.

4. The accessory of claim 3, wherein the first deformable portion and the second deformable portion are further configured to face each other in the unfolded state.

5. The accessory of claim 3, wherein the first deformable portion and the second deformable portion are further configured to be bent outwardly in the folded state.

6. The accessory of claim 2, wherein the connector further comprises:
   a first coupling portion connected to the first deformable portion and coupled to the first cover; and
   a second coupling portion connected to the second deformable portion and coupled to the second cover.

7. The accessory of claim 6, wherein the first coupling portion is detachably coupled to the first cover, and the second coupling portion is detachably coupled to the second cover.

8. The accessory of claim 6, wherein the first cover further comprises a first recess configured to be coupled by interference fit to the first coupling portion, and the second cover comprises a second recess configured to be coupled by interference fit to the second coupling portion.

9. The accessory of claim 6, wherein the first deformable portion and the second deformable portion are made of a first material, and the first coupling portion and the second coupling portion are made of a second material different from the first material.

10. The accessory of claim 9, wherein a hardness of the first material is greater than a hardness of the second material.

11. The accessory of claim 2, wherein the connector further comprises a wrapper configured to connect the first deformable portion to the second deformable portion, enclose at least a portion of the holder, and be coupled to the holder.

12. The accessory of claim 2, further comprising:
a first reinforcing portion and a second reinforcing portion attached to the first deformable portion and the second deformable portion, respectively.

13. The accessory of claim 1, further comprising:
a rivet configured to couple the holder to the connector.

14. The accessory of claim 1, wherein the connector further comprises:
a first coupling portion coupled to the first cover;
a second coupling portion coupled to the second cover;
a first neck disposed between the holder and the first coupling portion;
a second neck disposed between the holder and the second coupling portion; and
a stitch configured to bond the first neck to the second neck.

15. The accessory of claim 1, wherein the connector further comprises:
a first coupling portion coupled to the first cover;
a second coupling portion coupled to the second cover;
a first neck disposed between the holder and the first coupling portion; and
a second neck disposed between the holder and the second coupling portion, and
wherein the first neck and the second neck are thermo-compression bonded to each other.

16. The accessory of claim 1, wherein the holder is configured to rotate on a connecting portion disposed between the holder and the connector.

17. The accessory of claim 1, wherein the holder and the connector are integrated with the first cover and the second cover.

18. The accessory of claim 1, wherein the first cover comprises:
a first base surface;
a plurality of first side surfaces connected to at least some edges of the first base surface; and
a rib formed at an edge of the first base surface and/or an edge of at least one of a pair of the plurality of first side surfaces positioned on two sides of the first base surface.

19. An electronic device comprising:
a first housing;
a second housing;
a hinge cover configured to connect the first housing to the second housing; and
an accessory comprising a first cover configured to cover the first housing, a second cover configured to cover the second housing, a holder configured to receive a body part of a user, and a connector having a first deformable portion and a second deformable portion, the first deformable portion connecting holder to the first cover and the second deformable portion connecting the holder to the second cover,
wherein the connector is configured to have a first shape in an unfolded state of the electronic device, and have a second shape different from the first shape in a folded state of the electronic device, and wherein at least a portion of the connector is deformed in the second shape, and
wherein surfaces of the first deformable portion and the second deformable portion have a substantially the same shape during the folded and unfolded states of the electronic device.

20. The electronic device of claim 19, wherein the connector further comprises:
the first deformable portion disposed between the first cover and the holder; and
the second deformable portion disposed between the second cover and the holder.

21. The electronic device of claim 20, wherein the first deformable portion and the second deformable portion are configured to enclose at least a portion of the hinge cover in the folded state.

22. The electronic device of claim 21, wherein the first deformable portion and the second deformable portion are further configured to face each other in the unfolded state, and configured to be bent outwardly in the folded state.

23. An electronic device comprising:
a first housing;
a second housing; and
an accessory comprising a first cover configured to cover the first housing, a second cover configured to cover the second housing, a holder configured to receive a body part of a user, and a connector configured to connect the holder to the first cover and the second cover,
a connector having a first deformable portion and a second deformable portion, the first deformable portion connecting configured to connect the holder to the first cover and the second deformable portion connecting the holder to the second cover,
wherein the first housing and the second housing are configured to slide between a first position in which the first housing and the second housing are spaced apart by a first distance and a second position in which the first housing and the second housing are spaced apart by a second distance greater than the first distance,
wherein the connector is configured to have a first shape in an unfolded state of the electronic device, and have a second shape different from the first shape in a folded state of the electronic device, and wherein at least a portion of the connector is deformed in the second shape, and
wherein surfaces of the first deformable portion and the second deformable portion have a substantially the same shape during the folded and unfolded states of the electronic device.

\* \* \* \* \*